United States Patent
Hwang et al.

(10) Patent No.: US 11,825,443 B2
(45) Date of Patent: Nov. 21, 2023

(54) METHOD AND DEVICE FOR TRANSMITTING/RECEIVING WIRELESS SIGNAL IN WIRELESS COMMUNICATION SYSTEM

(71) Applicant: LG ELECTRONICS INC., Seoul (KR)

(72) Inventors: Seunggye Hwang, Seoul (KR); Youngdae Lee, Seoul (KR); Jaehyung Kim, Seoul (KR); Hyunsoo Ko, Seoul (KR); Inkwon Seo, Seoul (KR); Seonwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/961,316

(22) Filed: Oct. 6, 2022

(65) Prior Publication Data
US 2023/0043139 A1  Feb. 9, 2023

Related U.S. Application Data

(63) Continuation of application No. PCT/KR2021/010456, filed on Aug. 9, 2021.

(30) Foreign Application Priority Data

Aug. 7, 2020 (KR) .................. 10-2020-0099429

(51) Int. Cl.
*H04W 68/00* (2009.01)
*H04W 72/23* (2023.01)

(52) U.S. Cl.
CPC ......... *H04W 68/005* (2013.01); *H04W 72/23* (2023.01)

(58) Field of Classification Search
CPC ... H04W 68/005; H04W 72/23; H04W 52/02; H04W 68/00; H04W 72/12; H04W 68/02;
(Continued)

(56) References Cited

U.S. PATENT DOCUMENTS

| | | | | |
|---|---|---|---|---|
| 2012/0122495 | A1* | 5/2012 | Weng | H04W 68/025 455/458 |
| 2020/0084747 | A1* | 3/2020 | Hong | H04W 72/23 |
| 2023/0049119 | A1* | 2/2023 | Liu | H04W 68/02 |

FOREIGN PATENT DOCUMENTS

| | | |
|---|---|---|
| CN | 111357332 A | 6/2020 |
| WO | 2019029711 A1 | 2/2019 |

(Continued)

OTHER PUBLICATIONS

R1-1902025: CATT, 3GPP TSG RAN WG1 Meeting #96, Athens, Greece, Feb. 25-Mar. 1, 2019, "UE Power saving schemes and power saving signal/channel," CATT, (Feb. 16, 2019) 25 Pages.

*Primary Examiner* — Said M Elnoubi
(74) *Attorney, Agent, or Firm* — BRYAN CAVE LEIGHTON PAISNER LLP

(57) ABSTRACT

A method for a terminal receiving a signal in a wireless communication system, according to one embodiment of the present invention, may comprise: receiving a specific signal giving an early indication of whether paging DCI will be provided in a PO configured for a paging operation in an idle mode or deactivation mode; and, on the basis of the specific signal, determining whether to skip a paging DCI detection procedure, wherein the specific signal may be a PDCCH signal carrying specific DCI configured for the idle mode or deactivation mode, and even if the specific DCI indicates that the paging DCI will be provided in at least one PO, on the basis that the specific DCI may be connected to a plurality of POs, a terminal may decide to skip the paging (Continued)

DCI detection procedure if the at least one PO in which the paging DCI is provided is not configured in the terminal.

15 Claims, 19 Drawing Sheets

(58) Field of Classification Search
CPC ............... H04W 4/90; H04W 52/0212; H04W 52/0229; H04W 52/0235; Y02D 30/70
See application file for complete search history.

(56) References Cited

FOREIGN PATENT DOCUMENTS

WO          2019192218 A1    10/2019
WO    WO-2019192218 A1 * 10/2019    ........... H04L 1/1819

* cited by examiner

FIG. 6

Non - interleaved CCE - to - REG mapping

METHOD AND DEVICE FOR TRANSMITTING/RECEIVING WIRELESS SIGNAL IN WIRELESS COMMUNICATION SYSTEM

This application is a Continuation Application of International Application No. PCT/KR2021/010456, filed on Aug. 9, 2021, which claims the benefit of and priority to Korean Application No. 10-2020-0099429, filed on Aug. 7, 2020, the contents of which are all hereby incorporated by reference herein in their entirety.

TECHNICAL FIELD

The present disclosure relates to a wireless communication system, and more particularly, to a method and apparatus for transmitting and receiving a wireless signal.

BACKGROUND ART

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may be any of a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

DISCLOSURE

Technical Problem

An object of the present disclosure is to provide a method of efficiently performing wireless signal transmission/reception procedures and an apparatus therefor.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In one aspect of the present disclosure, provided herein is a method for receiving a signal by a terminal in a wireless communication system. The method may include receiving a specific signal early indicating whether paging downlink control information (DCI) is to be provided on a paging occasion (PO) configured for a paging operation in an idle mode or an inactive mode, and determining whether to skip a paging DCI detection procedure based on the specific signal. The specific signal may be a physical downlink control channel (PDCCH) signal carrying specific DCI configured for the idle mode or the inactive mode. Based on that the specific DCI can be associated with a plurality of POs, the terminal may determine to skip the paging DCI detection procedure unless the at least one PO on which the paging DCI is provided is configured for the terminal, even though the specific DCI indicates that the specific DCI to be provided on at least one PO.

The specific DCI early indicating whether the paging DCI will be provided may include a short message field related to at least one of a system information change or an Earthquake and Tsunami Warning System/Commercial Mobile Alert System (ETWS/CMAS) indication.

Even when the terminal determines to skip the paging DCI detection procedure, the terminal may obtain a value of the short message field included in the specific DCI.

The short message field included in the specific DCI may be at least partially identical to a short message field included in the paging DCI.

When the specific DCI is related to N POs={PO #1, PO #2, . . . , PO #N}, and each of the POs is associated with each terminal group, the terminal may determine an ID of a specific terminal group to which the terminal belongs, based on 'N' which is a number of the POs associated with the specific DCI, and PO information configured for the terminal.

The terminal may identify a bit position related to a specific PO associated with the specific terminal group in the specific DCI based on the determined ID of the specific UE group.

The terminal may determine the ID of the specific terminal group, further considering a terminal identifier of the terminal.

The terminal may determine whether to skip the paging DCI detection procedure based on whether the paging DCI is to be provided on a specific PO associated with a specific terminal group to which the terminal belongs among N POs related to the specific DCI.

The terminal may obtain information about 'N' which is a number of the POs associated with the specific DCI, from a base station.

The terminal may obtain information about a field configuration of the specific DCI or a size of at least one field included in the specific DCI from a base station.

In another aspect of the present disclosure, a computer-readable recording medium having recorded thereon a program for carrying out the signal reception method may be provided.

In another aspect of the present disclosure, a terminal for carrying out the signal reception method may be provided.

In another aspect of the present disclosure, a device for controlling a terminal for carrying out the signal reception method may be provided.

In another aspect of the present disclosure, provided herein is a method for transmitting a signal by a base station in a wireless communication system. The method may include transmitting a specific signal early indicating whether paging downlink control information (DCI) is to be provided on a paging occasion (PO) configured for a paging operation in an idle mode or an inactive mode, and transmitting the paging DCI based on the specific signal. The specific signal may be a physical downlink control channel (PDCCH) signal carrying specific DCI configured for the idle mode or the inactive mode. The base station may relate the specific DCI to a plurality of POs and transmit the specific DCI once to notify whether the paging DCI is provided for each of the plurality of POs at once.

In another aspect of the present disclosure, a base station for carrying out the signal transmission method may be provided.

Advantageous Effects

According to an embodiment of the present disclosure, a terminal may be enabled to operating in an idle/inactive mode more efficiently by indicating whether paging DCI is transmitted through PEI.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF DRAWINGS

Figure 6:
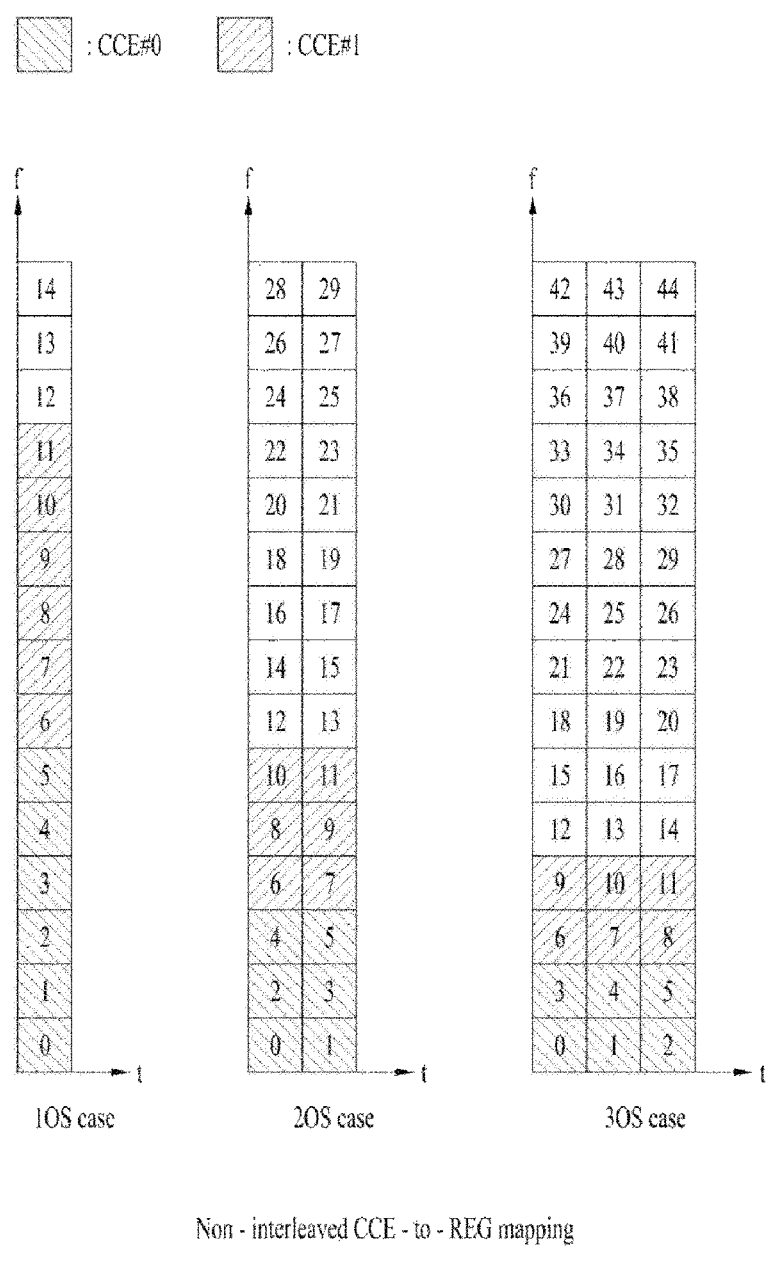

FIGS. 6 to 7 illustrate a structure of a control resource set (CORESET).

MODE FOR DISCLOSURE

Figure 1:
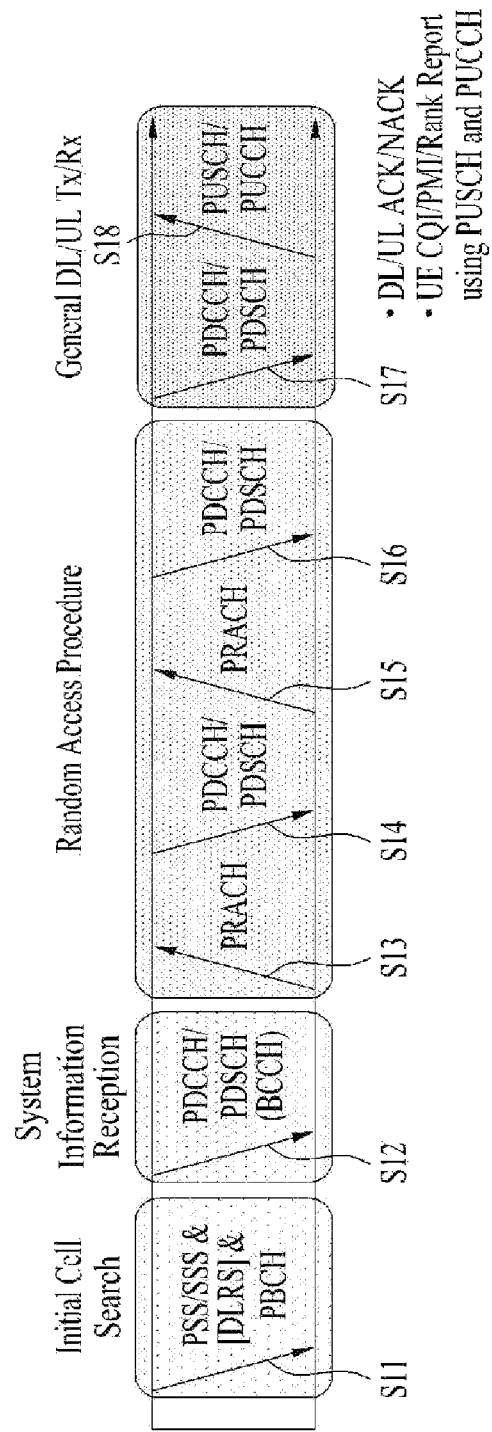
FIG. 1 illustrates physical channels used in a 3rd generation partnership project (3GPP) system as an exemplary wireless communication system, and a general signal transmission method using the same.

Embodiments of the present disclosure are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is part of Evolved UMTS (E-UMTS) using E-UTRA, and LTE-Advanced (A) is an evolved version of 3GPP LTE. 3GPP NR (New Radio or New Radio Access Technology) is an evolved version of 3GPP LTE/LTE-A.

As more and more communication devices require a larger communication capacity, there is a need for mobile broadband communication enhanced over conventional radio access technology (RAT). In addition, massive Machine Type Communications (MTC) capable of providing a variety of services anywhere and anytime by connecting multiple devices and objects is another important issue to be considered for next generation communications. Communication system design considering services/UEs sensitive to reliability and latency is also under discussion. As such, introduction of new radio access technology considering enhanced mobile broadband communication (eMBB), massive MTC, and Ultra-Reliable and Low Latency Communication (URLLC) is being discussed. In an embodiment of the present disclosure, for simplicity, this technology will be referred to as NR (New Radio or New RAT).

For the sake of clarity, 3GPP NR is mainly described, but the technical idea of the present disclosure is not limited thereto.

For the background art relevant to the present disclosure, the definitions of terms, and abbreviations, the following documents may be incorporated by reference.

3GPP LTE
TS 36.211: Physical channels and modulation
TS 36.212: Multiplexing and channel coding
TS 36.213: Physical layer procedures
TS 36.300: Overall description
TS 36.321: Medium Access Control (MAC)
TS 36.331: Radio Resource Control (RRC)
3GPP NR
TS 38.211: Physical channels and modulation
TS 38.212: Multiplexing and channel coding
TS 38.213: Physical layer procedures for control
TS 38.214: Physical layer procedures for data
TS 38.300: NR and NG-RAN Overall Description
TS 38.321: Medium Access Control (MAC)
TS 38.331: Radio Resource Control (RRC) protocol specification

Terms and Abbreviations

SS: Search Space
CSS: Common Search Space
USS: UE-specific Search Space
PDCCH: Physical Downlink Control Channel; The PDCCH is used to represent PDCCHs of various structures which may be used for the same purpose in the following description.
DCI: Downlink Control Information
WUS: Wake Up Signal
UG-field: A bit field configured in DCI for use for the purpose of UE group indication
UE_G_ID: UE group ID In a wireless communication system, a user equipment (UE) receives information through downlink (DL) from a base station (BS) and transmit information to the BS through uplink (UL). The information transmitted and received by the BS and the UE includes data and various control information and includes various physical channels according to type/usage of the information transmitted and received by the UE and the BS.

FIG. 1 illustrates physical channels used in a 3GPP NR system and a general signal transmission method using the same.

When a UE is powered on again from a power-off state or enters a new cell, the UE performs an initial cell search procedure, such as establishment of synchronization with a BS, in step S101. To this end, the UE receives a synchronization signal block (SSB) from the BS. The SSB includes a primary synchronization signal (PSS), a secondary synchronization signal (SSS), and a physical broadcast channel (PBCH). The UE establishes synchronization with the BS based on the PSS/SSS and acquires information such as a cell identity (ID). The UE may acquire broadcast information in a cell based on the PBCH. The UE may receive a DL reference signal (RS) in an initial cell search procedure to monitor a DL channel status.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Control information transmitted from the UE to the BS is referred to as uplink control information (UCI). The UCI includes hybrid automatic repeat and request acknowledgement/negative-acknowledgement (HARQ-ACK/NACK), scheduling request (SR), channel state information (CSI), etc. The CSI includes a channel quality indicator (CQI), a precoding matrix indicator (PMI), a rank indicator (RI), etc. While the UCI is transmitted on a PUCCH in general, the UCI may be transmitted on a PUSCH when control information and traffic data need to be simultaneously transmitted. In addition, the UCI may be aperiodically transmitted through a PUSCH according to request/command of a network.

Figure 2:
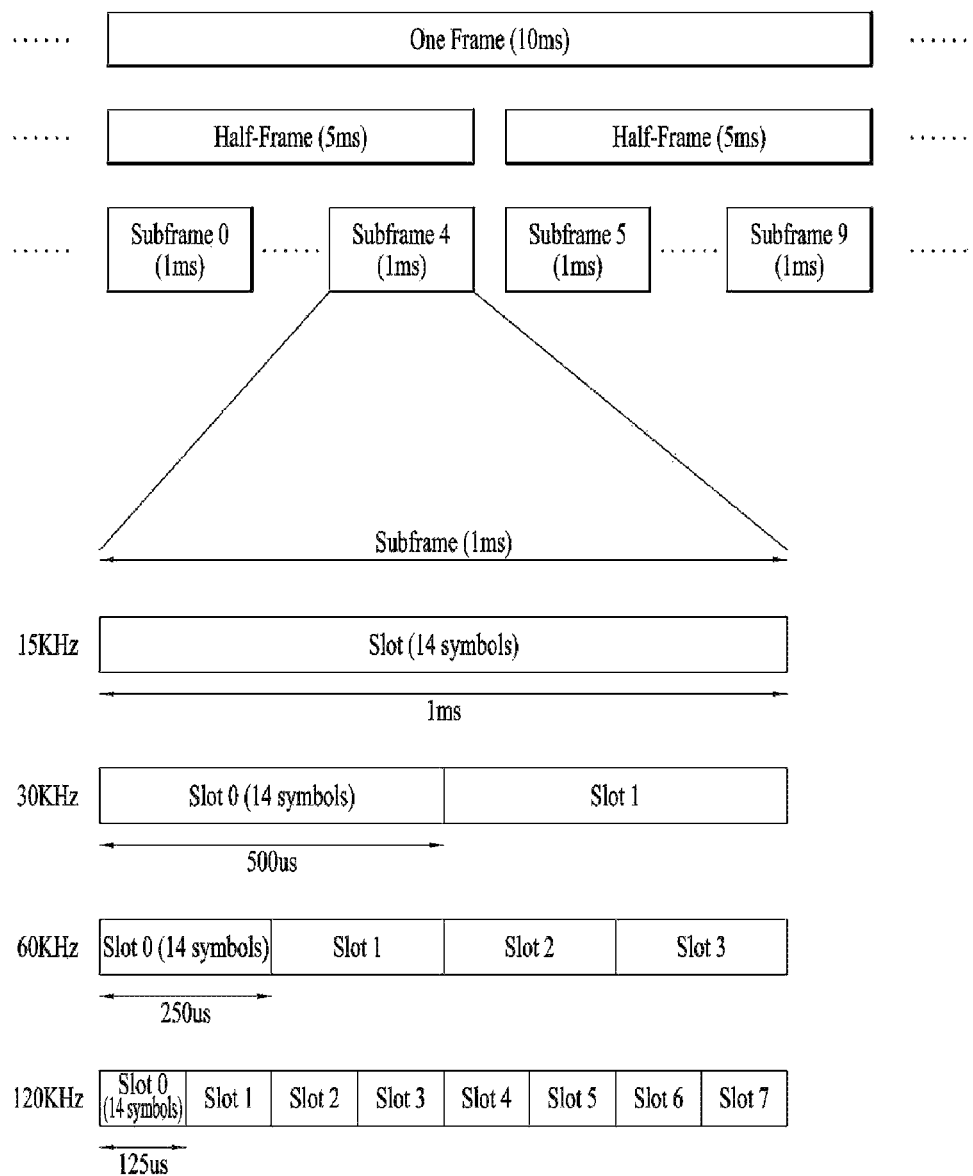
FIG. 2 illustrates a radio frame structure.

FIG. 2 illustrates a radio frame structure. In NR, uplink and downlink transmissions are configured with frames. Each radio frame has a length of 10 ms and is divided into two 5-ms half-frames (HF). Each half-frame is divided into five 1-ms subframes (SFs). A subframe is divided into one or more slots, and the number of slots in a subframe depends on subcarrier spacing (SCS). Each slot includes 12 or 14 Orthogonal Frequency Division Multiplexing (OFDM) symbols according to a cyclic prefix (CP). When a normal CP is used, each slot includes 14 OFDM symbols. When an extended CP is used, each slot includes 12 OFDM symbols.

Table 1 exemplarily shows that the number of symbols per slot, the number of slots per frame, and the number of slots per subframe vary according to the SCS when the normal CP is used.

TABLE 1

| SCS (15*2$^u$) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

*$N^{slot}_{symb}$: Number of symbols in a slot
*$N^{frame, u}_{slot}$: Number of slots in a frame
*$N^{subframe, u}_{slot}$: Number of slots in a subframe Table 2 illustrates that the number of symbols per slot, the number of slots per frame, and the number of slots per subframe vary according to the SCS when the extended CP is used.

TABLE 2

| SCS (15*2$^u$) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

The structure of the frame is merely an example. The number of subframes, the number of slots, and the number of symbols in a frame may vary.

In the NR system, OFDM numerology (e.g., SCS) may be configured differently for a plurality of cells aggregated for one UE. Accordingly, the (absolute time) duration of a time resource (e.g., an SF, a slot or a TTI) (for simplicity, referred to as a time unit (TU)) consisting of the same number of symbols may be configured differently among the aggregated cells. Here, the symbols may include an OFDM symbol (or a CP-OFDM symbol) and an SC-FDMA symbol (or a discrete Fourier transform-spread-OFDM (DFT-s-OFDM) symbol).

Figure 3:
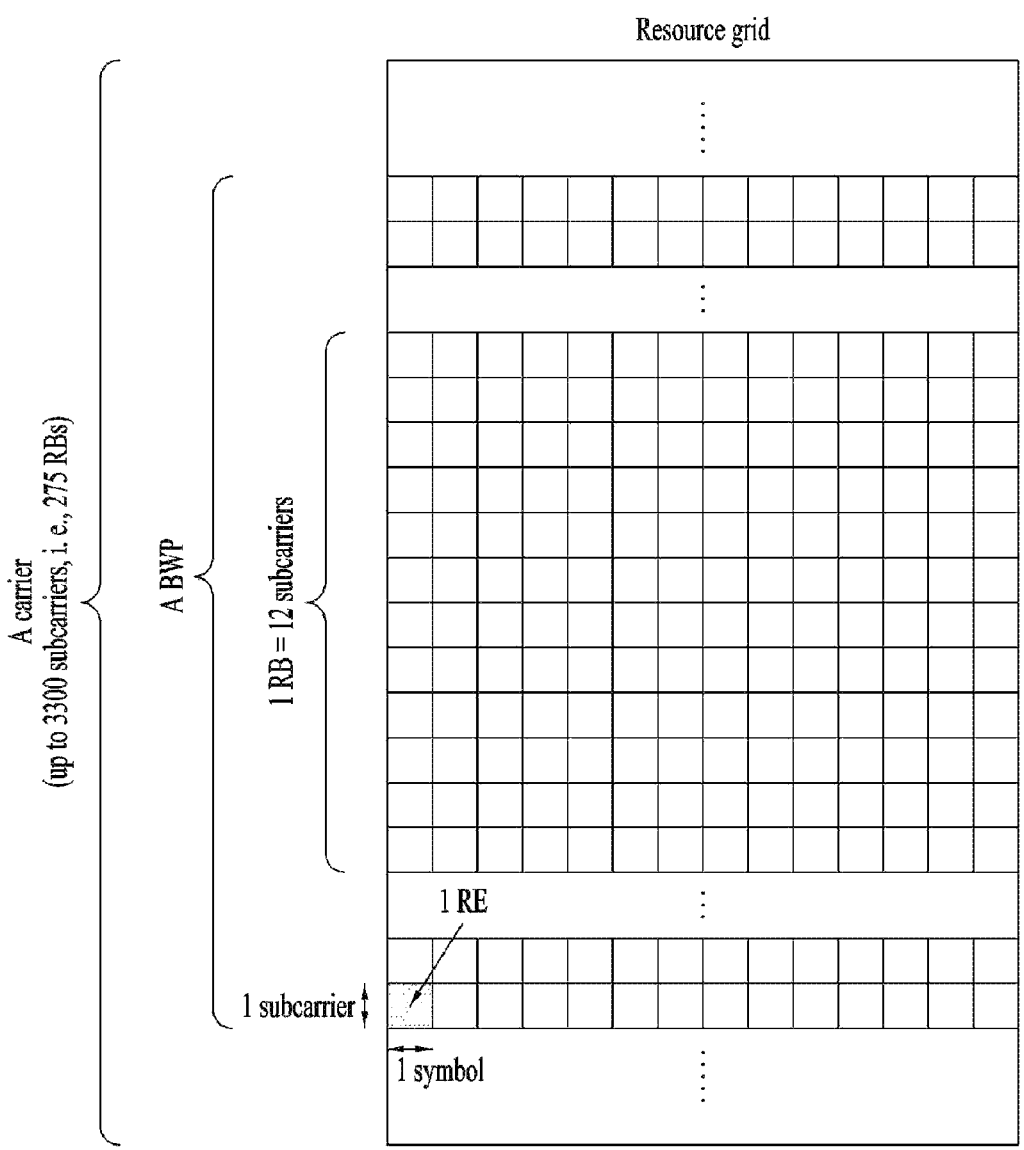
FIG. 3 illustrates a resource grid of a slot.

FIG. 3 illustrates a resource grid of a slot. A slot includes a plurality of symbols in the time domain. For example, when the normal CP is used, the slot includes 14 symbols. However, when the extended CP is used, the slot includes 12 symbols. A carrier includes a plurality of subcarriers in the frequency domain. A resource block (RB) is defined as a plurality of consecutive subcarriers (e.g., 12 consecutive subcarriers) in the frequency domain. A bandwidth part (BWP) may be defined to be a plurality of consecutive physical RBs (PRBs) in the frequency domain and correspond to a single numerology (e.g., SCS, CP length, etc.). The carrier may include up to N (e.g., 5) BWPs. Data communication may be performed through an activated BWP, and only one BWP may be activated for one UE. In the resource grid, each element is referred to as a resource element (RE), and one complex symbol may be mapped to each RE.

Figure 4:
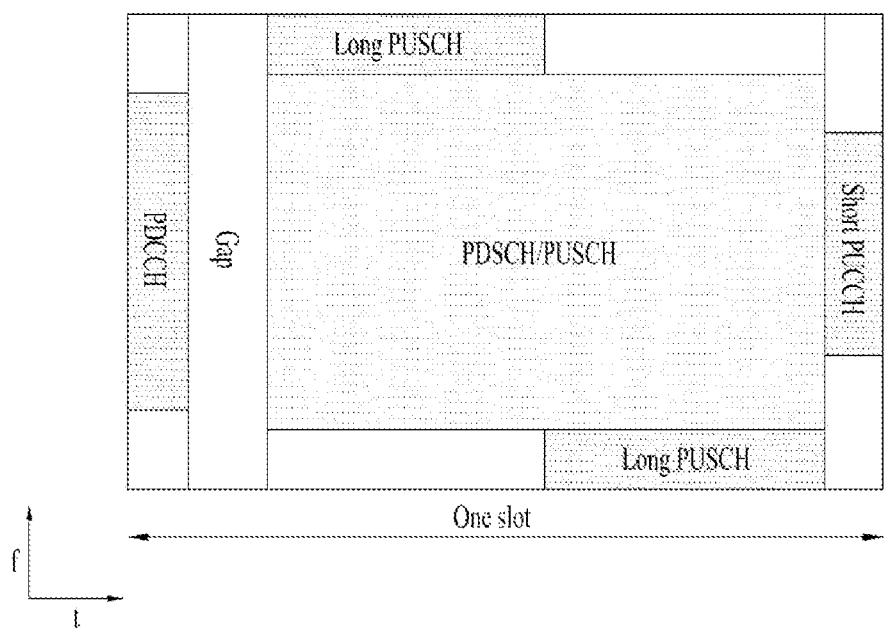
FIG. 4 illustrates exemplary mapping of physical channels in a slot.

FIG. 4 illustrates an example of mapping physical channels in a slot. In an NR system, a frame is characterized by a self-contained structure in which all of a DL control channel, DL or UL data, and a UL channel may be included in one slot. For example, the first N symbols of a slot may be used to carry a DL channel (e.g., PDCCH) (hereinafter, referred to as a DL control region), and the last M symbols of the slot may be used to carry a UL channel (e.g., PUCCH) (hereinafter, referred to as a UL control region). Each of N and M is an integer equal to or larger than 0. A resource area (hereinafter, referred to as a data region) between the DL control region and the UL control region may be used to transmit DL data (e.g., PDSCH) or UL data (e.g., PUSCH). A guard period (GP) provides a time gap for switching from a transmission mode to a reception mode or from the reception mode to the transmission mode. Some symbols at a DL-to-UL switching time in a subframe may be configured as a GP.

The PDCCH delivers DCI. For example, the PDCCH (i.e., DCI) may carry information about a transport format and resource allocation of a DL shared channel (DL-SCH), resource allocation information of an uplink shared channel (UL-SCH), paging information on a paging channel (PCH), system information on the DL-SCH, information on resource allocation of a higher-layer control message such as an RAR transmitted on a PDSCH, a transmit power control command, information about activation/release of configured scheduling, and so on. The DCI includes a cyclic redundancy check (CRC). The CRC is masked with various identifiers (IDs) (e.g. a radio network temporary identifier (RNTI)) according to an owner or usage of the PDCCH. For example, if the PDCCH is for a specific UE, the CRC is masked by a UE ID (e.g., cell-RNTI (C-RNTI)). If the PDCCH is for a paging message, the CRC is masked by a paging-RNTI (P-RNTI). If the PDCCH is for system information (e.g., a system information block (SIB)), the CRC is masked by a system information RNTI (SI-RNTI). When the PDCCH is for an RAR, the CRC is masked by a random access-RNTI (RA-RNTI).

Figure 5:
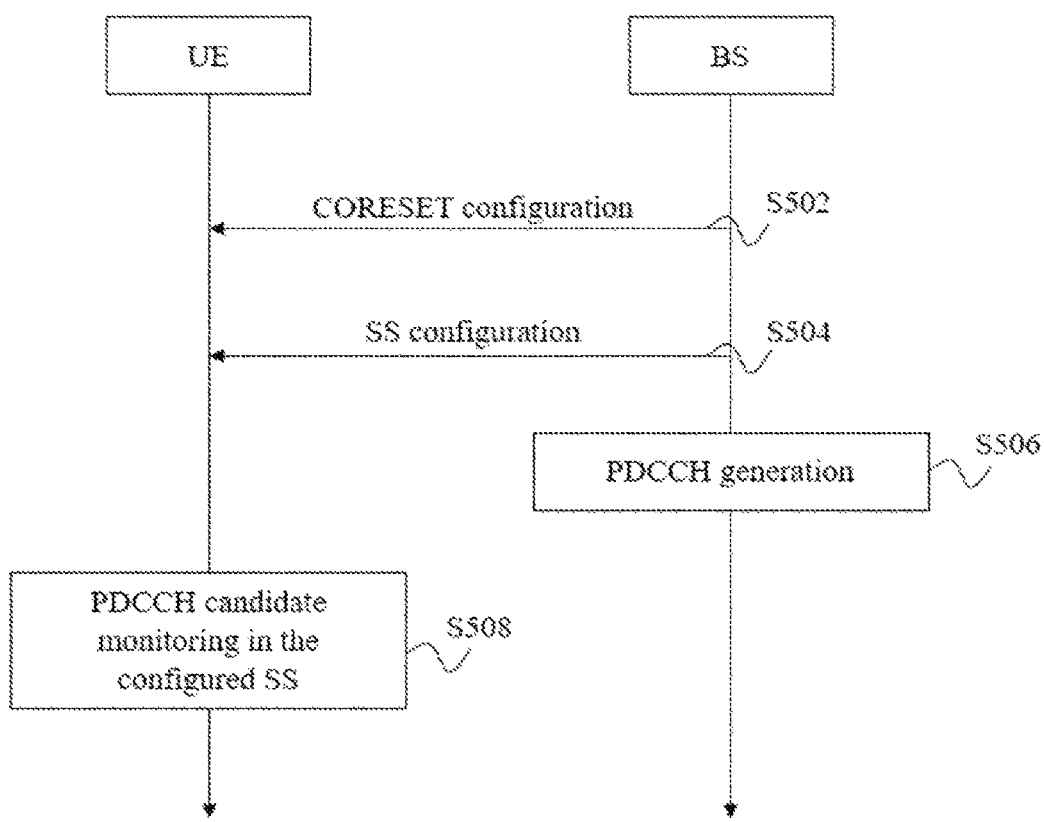
FIG. 5 illustrates an exemplary physical downlink control channel (PDCCH) transmission and reception process.
Figure 7:
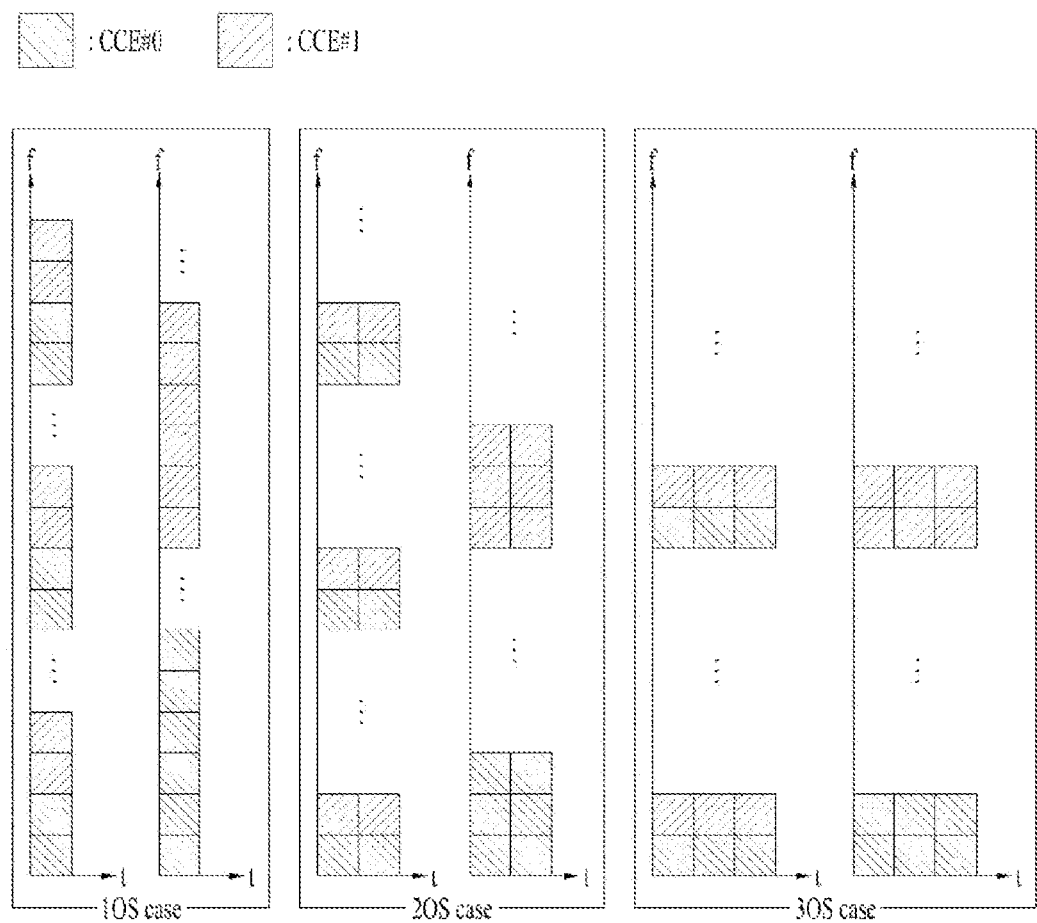

FIG. 5 illustrates an exemplary PDCCH transmission/reception process.

Referring to FIG. 5, a BS may transmit a control resource set (CORESET) configuration to a UE (S502). A CORESET is defined as a resource element group (REG) set having a given numerology (e.g., a subcarrier spacing (SCS), a cyclic prefix (CP) length, and so on). An REG is defined as one OFDM symbol by one (physical) resource block (P)RB. A plurality of CORESETs for one UE may overlap with each other in the time/frequency domain. A CORESET may be configured by system information (e.g., a master information block (MIB)) or higher-layer signaling (e.g., radio resource control (RRC) signaling). For example, configuration information about a specific common CORESET (e.g., CORESET #0) may be transmitted in the MIB. For example, a PDSCH carrying system information block 1 (SIB1) may be scheduled by a specific PDCCH, and CORESET #0 may be used to transmit the specific PDCCH. Further, configuration information about CORESET #N (e.g., N>0) may be transmitted by RRC signaling (e.g., cell-common RRC signaling, UE-specific RRC signaling, or the like). For example, the UE-specific RRC signaling carrying CORESET configuration information may include, but not limited to, various types of signaling such as an RRC setup message, an RRC reconfiguration message, and/or BWP configuration information. Specifically, a CORESET configuration may include the following information/fields.

controlResourceSetId: Indicates the ID of a CORESET.

frequencyDomainResources: Indicates the frequency-domain resources of the CORESET. The resources are indicated by a bitmap in which each bit corresponds to an RB group (=6 (consecutive) RBs). For example, the most significant bit (MSB) of the bitmap corresponds to a first RB group in a BWP. An RB group corresponding to a bit having a bit value of 1 is allocated as frequency-domain resources of the CORESET.

duration: Indicates the time-domain resources of the CORESET. It indicates the number of consecutive OFDM symbols included in the CORESET. The duration has a value between 1 and 3.

cce-REG-MappingType: Indicates a control channel element (CCE)-to-REG mapping type. An interleaved type and a non-interleaved type are supported.

interleaverSize: Indicates an interleaver size.

pdcch-DMRS-ScramblingID: Indicates a value used for PDCCH DMRS initialization. When pdcch-DMRS-ScramblingID is not included, the physical cell ID of a serving cell is used.

precoderGranularity: Indicates a precoder granularity in the frequency domain.

reg-BundleSize: Indicates an REG bundle size.

tci-PresentInDCI: Indicates whether a transmission configuration index (TCI) field is included in DL-related DCI.

tci-StatesPDCCH-ToAddList: Indicates a subset of TCI states configured in pdcch-Config, used for providing quasi-co-location (QCL) relationships between DL RS(s) in an RS set (TCI-State) and PDCCH DMRS ports.

Further, the BS may transmit a PDCCH search space (SS) configuration to the UE (S504). The PDCCH SS configuration may be transmitted by higher-layer signaling (e.g., RRC signaling). For example, the RRC signaling may include, but not limited to, various types of signaling such as an RRC setup message, an RRC reconfiguration message, and/or BWP configuration information. While a CORESET configuration and a PDCCH SS configuration are shown as separately signaled in FIG. 5, for convenience of description, the present disclosure is not limited thereto. For example, the CORESET configuration and the PDCCH SS configuration may be transmitted in one message (e.g., by one RRC signaling) or separately in different messages.

The PDCCH SS configuration may include information about the configuration of a PDCCH SS set. The PDCCH SS set may be defined as a set of PDCCH candidates monitored (e.g., blind-detected) by the UE. One or more SS sets may be configured for the UE. Each SS set may be a UE-specific search space (USS) set or a common search space (CSS) set. For convenience, PDCCH SS set may be referred to as "SS" or "PDCCH SS".

A PDCCH SS set includes PDCCH candidates. A PDCCH candidate is CCE(s) that the UE monitors to receive/detect a PDCCH. The monitoring includes blind decoding (BD) of PDCCH candidates. One PDCCH (candidate) includes 1, 2, 4, 8, or 16 CCEs according to an aggregation level (AL). One CCE includes 6 REGs. Each CORESET configuration is associated with one or more SSs, and each SS is associated with one CORESET configuration. One SS is defined based on one SS configuration, and the SS configuration may include the following information/fields.

searchSpaceId: Indicates the ID of an SS.

controlResourceSetId: Indicates a CORESET associated with the SS.

monitoringSlotPeriodicityAndOffset: Indicates a periodicity (in slots) and offset (in slots) for PDCCH monitoring.

monitoringSymbolsWithinSlot: Indicates the first OFDM symbol(s) for PDCCH monitoring in a slot configured with PDCCH monitoring. The first OFDM symbol(s) for PDCCH monitoring is indicated by a bitmap with each bit corresponding to an OFDM symbol in the slot. The MSB of the bitmap corresponds to the first OFDM symbol of the slot. OFDM symbol(s) corresponding to bit(s) set to 1 corresponds to the first symbol(s) of a CORESET in the slot.

nrofCandidates: Indicates the number of PDCCH candidates (one of values 0, 1, 2, 3, 4, 5, 6, and 8) for each AL where AL={1, 2, 4, 8, 16}.

searchSpaceType: Indicates CSS or USS as well as a DCI format used in the corresponding SS type.

Subsequently, the BS may generate a PDCCH and transmit the PDCCH to the UE (S506), and the UE may monitor PDCCH candidates in one or more SSs to receive/detect the PDCCH (S508). An occasion (e.g., time/frequency resources) in which the UE is to monitor PDCCH candidates is defined as a PDCCH (monitoring) occasion. One or more PDCCH (monitoring) occasions may be configured in a slot.

Table 3 shows the characteristics of each SS.

TABLE 3

| Type | Search Space | RNTI | Use Case |
|---|---|---|---|
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| | UE Specific | C-RNTI, or MCS-C-RNTI, or CS-RNTI(s) | User specific PDSCH decoding |

Table 4 shows DCI formats transmitted on the PDCCH.

TABLE 4

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used to schedule a TB-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH (DL grant DCI). DCI format 0_0/0_1 may be referred to as UL grant DCI or UL scheduling information, and DCI format 1_0/1_1 may be referred to as DL grant DCI or DL scheduling information. DCI format 2_0 is used to deliver dynamic slot format information (e.g., a dynamic slot format indicator (SFI)) to a UE, and DCI format 2_1 is used to deliver DL pre-emption information to a UE. DCI format 2_0 and/or DCI format 2_1 may be delivered to a corresponding group of UEs on a group common PDCCH which is a PDCCH directed to a group of UEs.

DCI format 0_0 and DCI format 1_0 may be referred to as fallback DCI formats, whereas DCI format 0_1 and DCI format 1_1 may be referred to as non-fallback DCI formats. In the fallback DCI formats, a DCI size/field configuration is maintained to be the same irrespective of a UE configuration. In contrast, the DCI size/field configuration varies depending on a UE configuration in the non-fallback DCI formats.

A CCE-to-REG mapping type is configured as one of an interleaved CCE-to-REG type and a non-interleaved CCE-to-REG type.

Non-interleaved CCE-to-REG mapping (or localized CCE-to-REG mapping) (FIG. 5): 6 REGs for a given CCE are grouped into one REG bundle, and all of the REGs for the given CCE are contiguous. One REG bundle corresponds to one CCE.

Interleaved CCE-to-REG mapping (or distributed CCE-to-REG mapping): 2, 3 or 6 REGs for a given CCE are grouped into one REG bundle, and the REG bundle is interleaved within a CORESET. In a CORESET including one or two OFDM symbols, an REG bundle includes 2 or 6 REGs, and in a CORESET including three OFDM symbols, an REG bundle includes 3 or 6 REGs. An REG bundle size is set on a CORESET basis.

Paging

The network may (i) access to UEs in RRC_IDLE, RRC_INACTIVE, and RRC_CONNECTED states by paging messages, and (ii) indicate a system information change and an earthquake and tsunami warning system/commercial mobile alert system (ETWS/CMAS) notification to UEs in the RRC_IDLE and RRC_INACTIVE states and UEs in the RRC_CONNECTED state by short messages. Both a paging message and a short message are transmitted based on a P-RNTI-based PDCCH. The paging message is transmitted on a logical channel, paging control channel (PCCH), whereas the short message is directly transmitted on a physical channel, PDCCH. Because the logical channel, PCCH is mapped to a physical channel, PDSCH, the paging message may be understood as scheduled based on a P-RNTI-based PDCCH.

While the UE stays in the RRC_IDLE state, the UE monitors a paging channel for core network (CN)-initiated paging. In the RRC_INACTIVE state, the UE also monitors the paging channel, for radio access network (RAN)-initiated paging. The UE does not need to monitor the paging channel continuously. Paging discontinuous reception (DRX) is defined as monitoring a paging channel only during one paging occasion (PO) per DRX cycle by a UE in the RRC_IDLE or RRC_INACTIVE state. A paging DRX cycle is configured by the network, as follows.

1) In the case of CN-initiated paging, a default cycle is broadcast in system information.

2) In the case of CN-initiated paging, a UE-specific cycle is configured by NAS signaling.

3) In the case of RAN-initiated signaling, a UE-specific cycle is configured by RRC signaling.

Because all of POs of the UE for CN-initiated signaling and RAN-initiated signaling are based on the same UE ID, the two POs overlap with each other. The number of POs in a DRX cycle may be set by system information, and the network may distribute UEs to the POs based on IDs.

When the UE is in the RRC_CONNECTED state, the UE monitors a paging channel in each PO signaled by system information, for an SI change indication and a PWS notification. In bandwidth adaptation (BA), the RRC_CONNECTED UE monitors only a paging channel in an active BWP in which a configured CSS is located.

In shared spectrum channel access, additional PDCCH monitoring occasions may be configured in a PO of the UE, for paging monitoring. However, when the UE detects a P-RNTI-based PDCCH transmission in its PO, the UE does not need to monitor subsequent PDCCH monitoring occasions in the PO.

To reduce power consumption, the UE may use DRX in the RRC_IDLE and RRC_INACTIVE states. The UE monitors one PO per DRX cycle. A PO is a set of PDCCH monitoring occasions, and may include multiple time slots (e.g., subframes or OFDM symbols) in which paging DCI may be transmitted. One paging frame (PF) is one radio frame and may include one or more POs or the starting points of one or more POs.

In a multi-beam operation, the UE assumes that the same paging message and the same short message are repeated in all transmission beams. The paging message is the same for both of RAN-initiated paging and CN-initiated paging.

Upon receipt of RAN-initiated paging, the UE initiates an RRC connection resume procedure. Upon receipt of CN-initiated paging in the RRC_INACTIVE state, the UE transitions to the RRC_IDL state and notifies the NAS of the CN-initiated paging.

A PF and a PO for paging are determined in the following manner

An SFN for the PF is determined by:

$(SFN+PF\_\text{offset}) \bmod T = (T \text{ div } N)*(UE\_ID \bmod N)$

An index i_s indicating the index of the PO is determined by:

$i\_s = \text{floor}(UE\_ID/N) \bmod Ns$

The following parameters may be used to calculate the PF and i_s above.
  T: The DRX cycle of the UE (T is determined by the smallest of UE-specific DRX values (if configured by RRC and/or an upper layer) and a default DRX value broadcast in system information. In the RRC_IDLE state, if UE-specific DRX is not configured by an upper layer, the default value is applied).
  N: Number of total paging frames in T
  Ns: Number of POs for a PF
  PF_offset: Offset used for PF determination
  UE_ID: 5G-S-TMSI mod 1024

Power Saving Channel Design for UEs in the Idle/Inactive Mode

In embodiments of the present disclosure, a method for obtaining a power saving effect by using DCI transmitted in a search space monitored by an idle/inactive mode UE is proposed. Although embodiments are described focusing on the DCI design expected by the idle/inactive mode UE when monitoring the CSS, they may be applied even to the DCI expected by a connected mode UE or DCI transmitted through the USS as long as the idea of the invention is maintained.

In LTE Rel-15 NB-IoT and MTC, a wake-up signal (WUS) was introduced to save power of a UE. The WUS is a signal indicating preliminarily whether there is an actual paging transmission in a paging SS at a specific position. When the BS wants to transmit paging in a PO at a specific position, the BS may transmit a WUS at WUS transmission position(s) associated with the PO. The UE monitors the WUS transmission positions associated with the PO at the specific position. Upon detection of the WUS at the WUS transmission position(s), the UE may expect that paging will be transmitted in the PO, whereas when failing to detect the WUS at the WUS transmission position(s), the UE may not expect paging in the PO. The gain of power saving may be achieved by this operation. In LTE Rel-16 NB-IoT and MTC, a UE-group WUS was introduced to increase the power saving gain of the Rel-15 WUS. The UE-group WUS may advantageously reduce an unnecessary wakeup probability of a UE by using a WUS transmission position and sequence determined based on the UE-group ID of the UE.

Rel-16 NR has introduced a DCI-based power saving technique to support power saving in the connected mode. To this end, DCI formats 2-6 are newly introduced. The position of a bit for the UE to monitor in DCI formats 2-6 is indicated to the UE by the BS, and the UE determines the power saving operation in an active time interval based on the bit information about the position. DCI formats 2-6 are intended for connected mode UEs, and accordingly, use thereof is not defined for idle/inactive mode UEs. In addition, the DCI-format field configuration is not suitable for idle/inactive mode UEs because it is dedicated to the connected mode.

As discussed in Rel-16 NB-IoT and MTC, when UEs in the idle/inactive mode monitor a paging search space, unnecessary wake-up may occur if paging for other UEs sharing the same PO is transmitted, resulting in an increase in power consumption of the UE. For example, when paging for UE #1 occurs, UEs #2 to #N, which are not subject to paging, may unnecessarily perform a PDSCH reception procedure (to receive a paging message), and accordingly damage may occur in terms of power consumption efficiency. In addition, since the PDSCH for transmitting and receiving a paging message is likely to be scheduled in the same slot as the PDCCH, it is necessary to prepare in advance to receive the PDSCH immediately after receiving the PDCCH, which may cause unnecessary power consumption. For example, when paging occurs (e.g., P-RNTI-based PDCCH is detected on a PO), UEs #1 to #N should all be prepared for receiving a paging message carried by the PDSCH under the potential possibility that the UEs may be actual recipients of the paging message. Since the PDCCH is more robust than the PDSCH, the preparation operation of the UE for successful reception of the PDSCH requires more time and power than the preparation operation of the UE for successful reception of the PDCCH. When the UE prepares for potential PDSCH reception, it causes higher power consumption than when only the PDCCH is received without preparing for PDSCH reception.

In one example of the present disclosure, DCI configured for the purpose of delivering information about a specific channel as described above will be defined as P-DCI and described.

As one example to which the proposals apply, a method for transmitting information about channel-B (e.g., paging) by channel/signal-A (e.g., PEI composed of control channels such as DCI) in communication systems such as LTE and NR may be considered. Here, at least some of the following information may be included in the information about channel-B transmitted by the channel/signal-A.

(1) Information indicating whether channel-B is transmitted (2) Information about a specific (or a specific number of) UE(s) that need to acquire channel-B (3) Information contained in channel-B Channel-B may be a control channel having a purpose of scheduling PDSCH/PUSCH, such as PDCCH, or a data channel such as the PDSCH/PUSCH. For example, channel-B may be a PDCCH on which paging DCI is transmitted in an idle/inactive mode, or a PDSCH on which a message is carried by the paging DCI.

Figure 8:
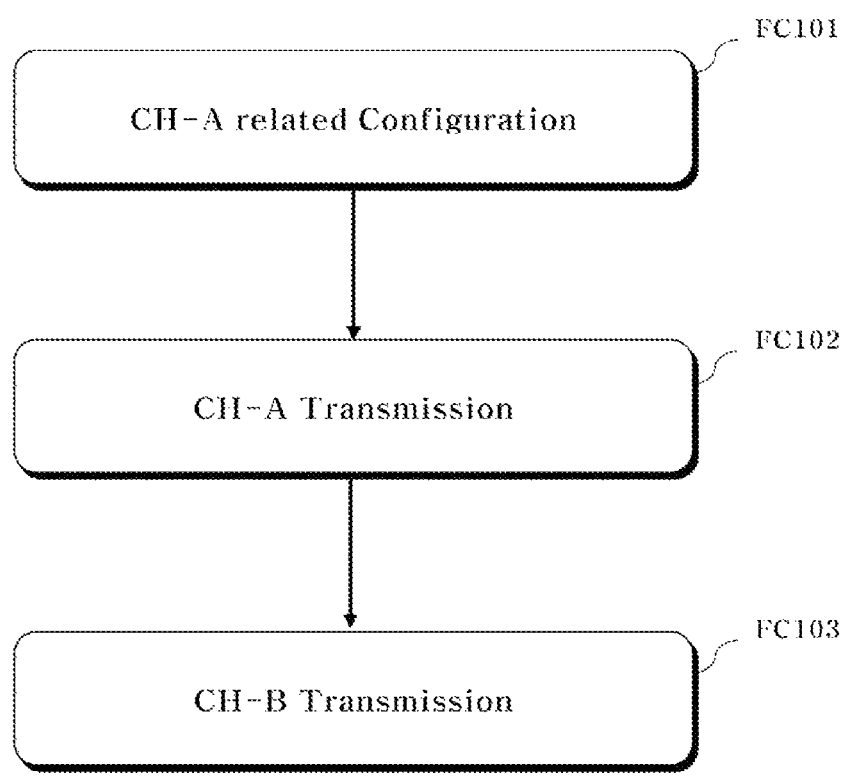
FIG. 8 illustrates a BS operation according to an embodiment of the present disclosure.

FIG. 8 illustrates a BS operation according to an embodiment of the present disclosure.

Referring to FIG. 8, the BS may generate configuration information related to channel/signal-A (e.g., P-DCI) and transmit the same (FC101). For example, the channel/signal-A related configuration information may be transmitted using a higher layer signal (e.g., SIB or RRC signaling).

The BS may generate and transmit channel/signal-A (e.g., P-DCI) based on the channel/signal-A related configuration information (FC102). For example, when channel/signal-A is P-DCI, the BS may generate channel/signal-A (e.g., P-DCI) including UE-group ID information, cell ID information, short message related information, and/or PDSCH scheduling information.

The BS may transmit channel/signal-A (e.g., P-DCI) generated at a position (e.g., search space) where channel/signal-A (e.g., P-DCI) may be transmitted, based on the configuration information.

The BS may transmit channel/signal-B at a position related to information included in the transmitted channel/signal-A (e.g., P-DCI) (FC103). For example, signal-B may be a reference signal (e.g., DMRS, CSI-RS/TRS), and channel-B may be a PDCCH for scheduling a paging message or a PDSCH containing a paging message.

Figure 9:
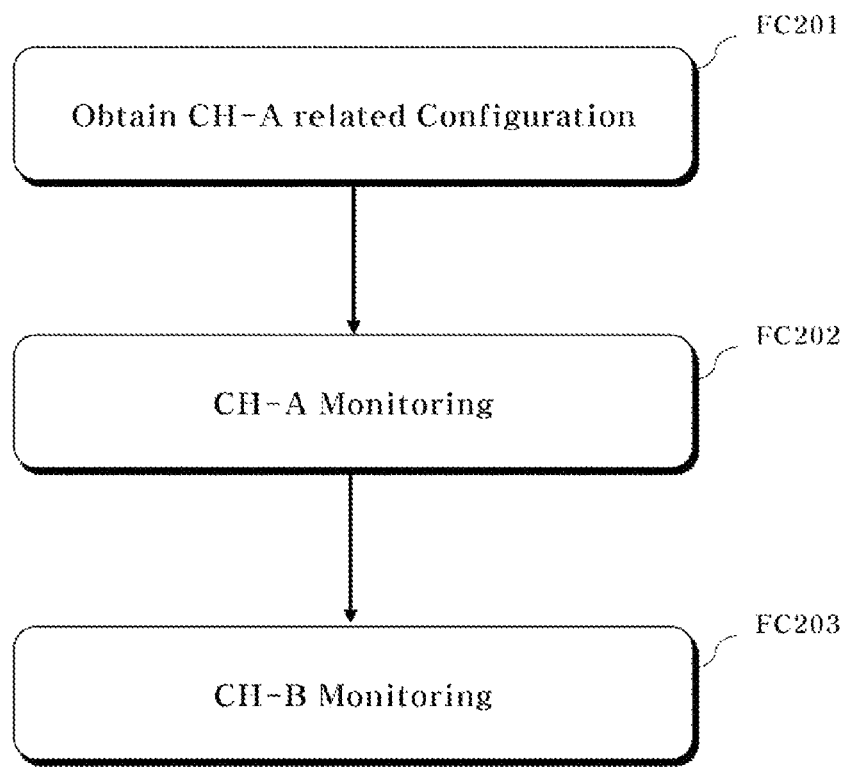
FIG. 9 illustrates a UE operation according to an embodiment of the present disclosure.

FIG. 9 illustrates a UE operation in an example of the present invention.

The UE may receive configuration information related to channel/signal-A (e.g., P-DCI) to perform an operation for channel/signal-A (e.g., P-DCI) (FC201). For example, the UE may receive the configuration information using a higher layer signal (e.g., SIB or RRC signaling).

The UE may expect and monitor channel/signal-A (e.g., P-DCI) based on the configuration information (FC202). For example, the BS may expect information including UE-group ID information, cell ID information, short message related information, and/or PDSCH scheduling information through channel/signal-A (e.g., P-DCI). The UE may also monitor channel/signal-A (e.g., P-DCI) generated at a position (e.g., search space) where the channel/signal-A (e.g., P-DCI) may be transmitted, based on the above configuration information.

If the UE succeeds in detecting channel/signal-A (e.g., P-DCI) in the monitoring operation and is instructed to monitor channel/signal-B (FC202), the UE may monitor channel/signal-A (e.g., P-DCI) at a position related to the transmitted channel/signal-A (FC203). For example, signal-B may be a reference signal (e.g., DMRS, CSI-RS/TRS), and channel-B may be a PDCCH for scheduling a paging message or a PDSCH containing a paging message.

In an embodiment of the present disclosure, some of the following methods may be selected and applied. The methods may be operated independently without a separate combination thereof, or may be operated in a manner that one or more methods are combined and connected. Some terms, symbols, orders, and the like used for the description of the disclosure may be replaced with other terms, symbols, orders, and the like as long as the principle of the disclosure is maintained.

In the following embodiment, an arbitrary structure for transmission and reception of channel/signal-A and channel/signal-B is illustrated as an example to explain the principle of the disclosure, but it should be noted that the proposed methods do not specify and limit the transmission and reception type of channel/signal-A or channel/signal-B unless stated otherwise. Therefore, it will be understood by those skilled in the art that the proposals in this specification may be applied to the all structures of channel/signal-A (e.g., P-DCI) transmission and reception unless the principle of the disclosure is violated.

The following embodiments are illustrated based on the NR system to explain the principle of the disclosure, but it should be noted that the proposed methods do not specify and limit the transmission and reception type of NR unless stated otherwise. Therefore, it will be understood by those skilled in the art that the proposed methods may be applied to all wireless communication transmission and reception structures unless the principle of the disclosure is violated.

(Proposal 0) Configuring a Field Containing Group/Sub-group Information about UEs in the P-DCI In an example of the present disclosure, a method for determining/indicating a group/subgroup (hereinafter referred to as "UE-group") of UEs (in an idle/inactive mode for monitoring PO(s)) based on P-DCI is proposed. For example, a method of configuring a field for indicating a UE-group in P-DCI as in Proposal 0 may be included. For simplicity, in an example of the present disclosure, the DCI field/information for indicating the UE-group will be defined as a "UG-field" and described.

The UG-field may be configured in the form of a bitmap. When the UG-field is composed of N bits, the UE may pre-recognize the position of a bit corresponding to the UE-group thereof among the N bits. The UE may determine whether the corresponding P-DCI is related to the UE-group thereof (e.g., whether information for the UE-group is included in the corresponding P-DCI or will be transmitted after the P-DCI) by checking 0/1 as the binary value of the bit thereof among the N bits.

(Proposal 0-1) UE-Group Operation Scheme

For the UE-group operation scheme proposed in an example of the present disclosure, methods of one or more of Proposal 0-1-A or Proposal 0-1-B may be combined and used. For the UE-group operation scheme described in the following disclosure, one of the methods described in Proposal 0 may be used, and may be extended and applied to a UE-group configuration method of another scheme unless the principle of the disclosure is violated.

(Proposal 0-1-A) Operation Performed when One or More POs can Correspond to/be Associated with a Single P-DCI For example, it is proposed that PO information (e.g., position information about the PO) for a UE be used/included in determining the UE-group of the UE.

Figure 10:
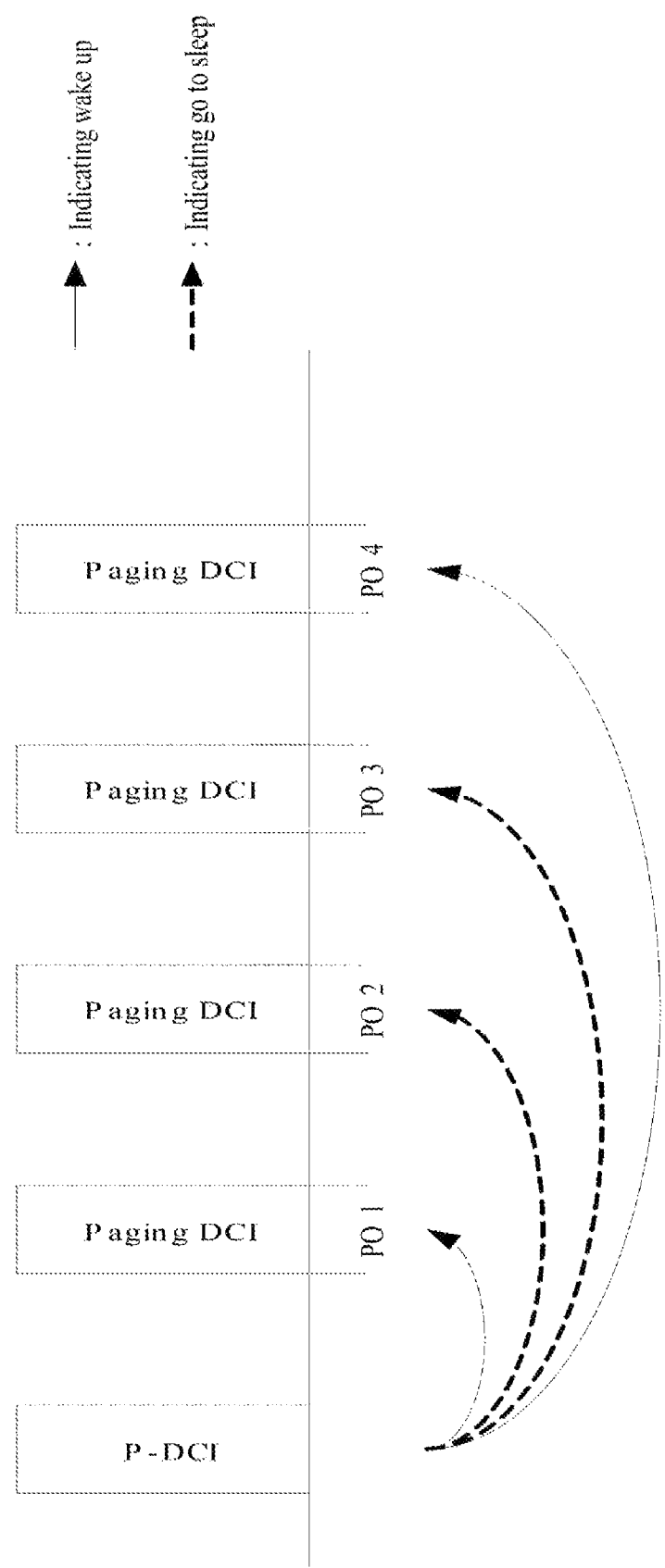
FIGS. 10 and 11 illustrate PEI according to an embodiment of the present disclosure.

One or more POs may be designed/operated to correspond to/be associated with one P-DCI. One P-DCI is not necessarily constrained to have a 1:1 correspondence relationship with one PO, and a common P-DCI may be used for N PO(s) (where 0<N<max # of POs). For example, referring to FIG. 10, four Pos, POs #1, #2, #3, and #4, correspond to/are associated with one P-DCI. With the method proposed in Proposal 0-1-A, wake-up information about the UE may be provided using the P-DCI, and the network overhead for transmission of the P-DCI may be saved.

The P-DCI may be used to indicate an actually activated PO (e.g., PO requiring monitoring of the paging DCI) among one or more POs corresponding to/associated with the P-DCI.

When the UE-group has a 1:1 correspondence relationship with the PO, for example, when a different UE group is assigned to each PO, activating a PO by the P-DCI may be understood as activating a UE-group corresponding to the PO.

Alternatively, when multiple UE-groups are associated with one PO, the UE-group may be understood as UE sub-grouping within one PO, as described later in Proposal 0-1-B. Alternatively, N UE groups may correspond to M POs. In order to avoid obscuring the subject matter of the description, it will be assumed in the following description that the UE-group have a one-to-one correspondence relationship with the POs, which is the simplest example.

Figure 14:
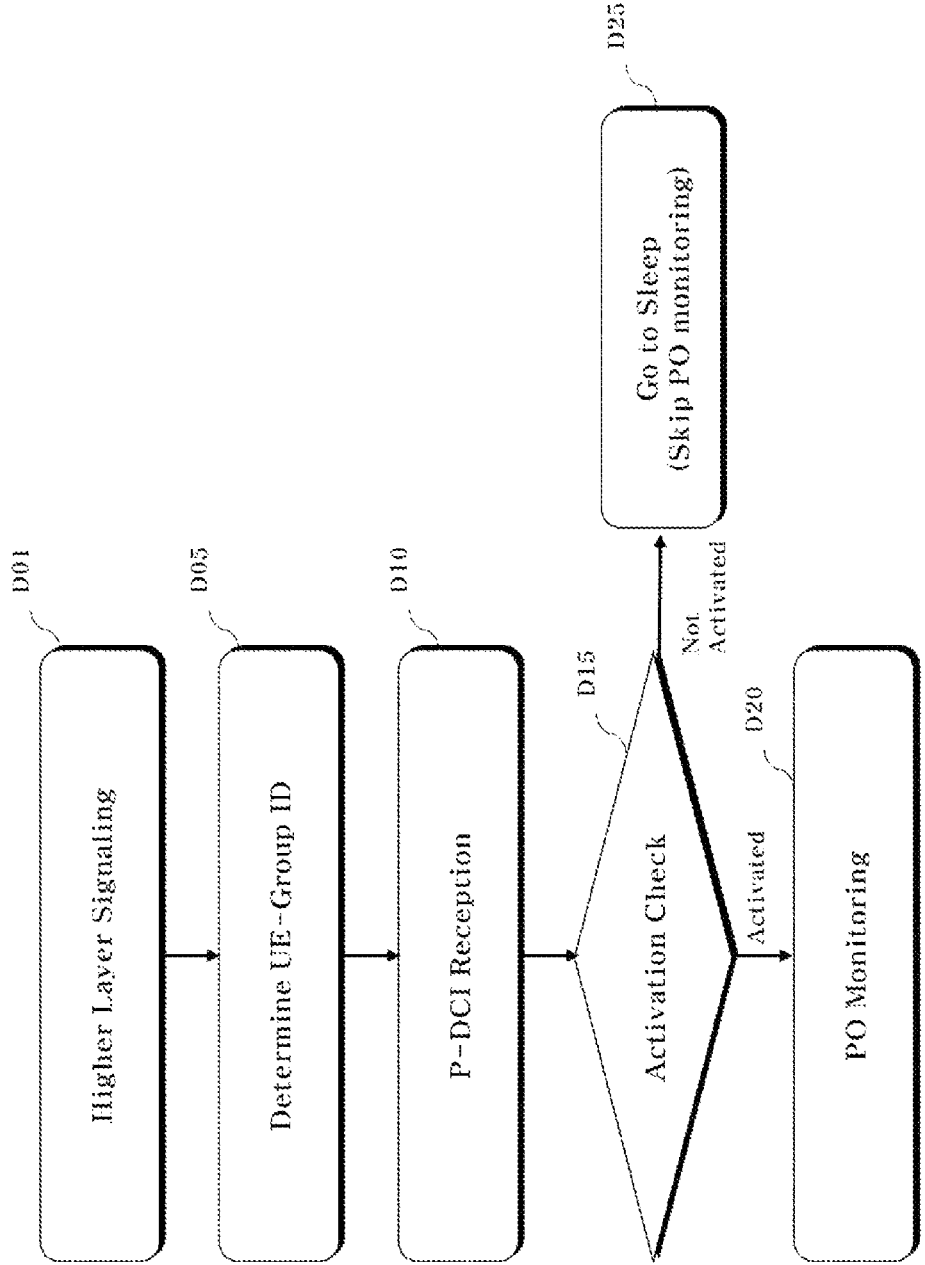
FIGS. 14 and 15 are examples of implementation of a UE operation according to an embodiment of the present disclosure.

As an example, as shown in FIG. 14, the UE may calculate an ID of the UE-group thereof (D05), and check whether the PO activated by the P-DCI corresponds to the UE-group ID based on the calculated ID of the UE-group (D15). The UE may check whether the PO associated with the UE-group thereof is activated by the P-DCI.

As an example of UE-group ID calculation, the UE may calculate the ID of the UE-group thereof based on information related to the PO thereof (or parameters used to determine the PO) and the number of PO(s) corresponding to one P-DCI.

When detection D10 of the P-DCI is successful, the UE may check the index of the activated PO (D15). When the UE recognizes that the PO related to the UE-group to which the UE belongs has been activated, the UE may determine to monitor the paging DCI for the position determined based on the P-DCI (e.g., the PO position for which activation is indicated by the P-DCI) among the PO(s) (to be monitored or associated with the P-DCI) (D20).

When the BS has paging information (e.g., paging PDSCH and/or short message) to send, the BS may transmit P-DCI including PO information about the UE-group to receive the paging information at a position (e.g., bit position within the P-DCI) corresponding to the PO on which the paging information is to be transmitted.

In order to carry out Proposal 0-1-A, the UE may require information about the number of POs corresponding to one P-DCI. The information (or the method of determining the number of POs) may be fixed/defined according to a standard, or the BS may set/signal the number of PO(s) corresponding to one P-DCI through higher layer signaling (D01).

(Proposal 0-1-B) Including Sub-Grouping of UEs Monitoring the Same PO in UE-Group Determination A method used for a UE-group of UEs to sub-group and distinguish UEs monitoring the same PO is proposed. The UE may calculate the UE-group ID using the UE ID thereof and/or information configured from the BS, and may operate by checking the ID of the activated UE-group when it succeeds in detecting the P-DCI. When the UE determines that the UE-group to which the UE belongs has been activated, the UE may perform a subsequent operation for receiving the PDSCH on which the paging message is transmitted. In this case, the subsequent operation for receiving the PDSCH may include monitoring the paging DCI on a PO corresponding to the P-DCI, or performing PDSCH reception based on received PDSCH scheduling information. To this end, when the BS has paging information to send, it may be configured to transmit P-DCI including activation information about the UE-group to receive paging information at a transmission position (e.g., a PO or P-DCI transmission search space corresponding to the PO) of the P-DCI to be transmitted.

In order to carry out Proposal 0-1-B, the UE may need information on the number of UE-groups for distinguishing UEs monitoring the same PO. The information may be fixed according to a standard or may be a value configured by the BS through higher layer signaling.

With the method proposed in Proposal 0-1-B, the influence of unnecessary awakening of the UE due to paging for other UEs monitoring the same PO when the UE does not need to acquire paging information may be reduced.

(Proposal 0-2) Determining a UE-Group of the UE

As a method of determining the UE-group of the UE proposed in one example of the present disclosure, a combination of one or more of the method in Proposal 0-2-A or Proposal 0-2-B disclosed below may be used. For the UE-group described below, one of the methods in Proposal 0 may be used, and may be extended and applied to other UE-group configuration methods unless the principle of the disclosure is violated.

(Proposal 0-2-A) Generating a UE-Group ID Using the UE ID of the UE

A method of determining a UE-group ID used for P-DCI using a unique UE ID of a UE is proposed. In NR, the UE uses UE ID, which is a result of calculation using 5G-S-TMSI, to determine a PO in performing the paging operation. In a similar operation, the value of the UE ID and the total number of UE-group IDs may be utilized as one method of determining a unique UE-group ID by the UE. As a specific example, Equation 1 may be used as a method of determining a UE-group ID (hereinafter, UE_G_ID) for a UE ID in order to distribute UEs monitoring the same PO at the same ratio.

$$UE\_G\_ID = \text{floor}(UE\_ID/N/Ns) \bmod N_G \quad \text{[Equation 1]}$$

In Equation 1, N and Ns denote the number of total paging frames in T and the number of paging occasions for a PF (e.g., see Section 7.1 of TS 38.304), respectively, and $N_G$ denote the total number of UE-groups that may be distinguished in UE grouping corresponding one PO. The value of NG may be determined by a rule predetermined by a standard or may be information broadcast through higher layer signaling such as SIB.

To this end, the UE may calculate UE_G_ID thereof using the UE ID in accordance with the predetermined rule as in the above example and use the same to detect P-DCI. When the UE succeeds in detecting the P-DCI and determines that the UE-group to which the UE belongs has been activated, the UE may perform a subsequent operation for receiving the PDSCH on which the paging message is transmitted. In this case, the subsequent operation for receiving the PDSCH may include monitoring the paging DCI on a PO corresponding to the P-DCI, or performing PDSCH reception based on received PDSCH scheduling information. To this end, when the BS has paging information to send, it may calculate UE_G_ID based on the target UE ID and be configured determine to transmit P-DCI including activation information about the UE-group to receive paging information at a transmission position (e.g., a PO or P-DCI transmission search space corresponding to the PO) of the P-DCI to be transmitted.

With the method proposed in Proposal 0-2-A, the BS and the UE may be configured to calculate the same information on UE_G_ID of the UE even without separate dedicated signaling for a specific UE. Thereby, network overhead caused by higher layer signaling may be saved.

(Proposal 0-2-B) Generating a UE-Group ID Using a Separate Configuration

When there is a separate configuration between the UE and the BS, it is proposed that a UE-group ID used in the P-DCI be determined using the separate configuration. The separate configuration may include a RACH procedure in the idle/inactive mode of the UE or a report/request procedure performed by the UE in the connected mode, and may include a configuration procedure provided by the BS (or a higher node).

As a specific example of Proposal 0-2-B, the UE may be configured to determine how to interpret information included in UE_G_ID thereof and/or P-DCI based on information separately indicated by the BS. For example, when UE_G_ID is indicated, the UE may determine the position of the UE-group bitmap field corresponding to UE_G_ID and use the same. Alternatively, the BS may provide the UE with information on a bit region meaningful to the UE within the P-DCI (e.g., starting bit index and bit size that the UE should monitor).

To this end, the UE may be configured to provide a report or request including information related to the UE. Here, the information may be information for obtaining information related to P-DCI for the BS, or a report/request of information for other purposes may be used for P-DCI purposes. Thereafter, the UE may obtain configuration information usable for the P-DCI from the BS and perform the operation of monitoring the P-DCI based on the information.

To this end, the BS may configure information related to the P-DCI for the UE based on the report/request information received from the UE. The operation may be performed by a node higher than the BS, and the BS may be configured to perform an operation of the P-DCI based on the information provided from the higher node.

With the method proposed in Proposal 0-2-A, the BS (or a higher node) may make the power saving operation of the UE efficient in consideration of the characteristics of the UE and the network.

In the following embodiments, even when there is no separate description, the method proposed in Proposal 0 may be applied to the operation of the described UE-group indication.

Figure 11:
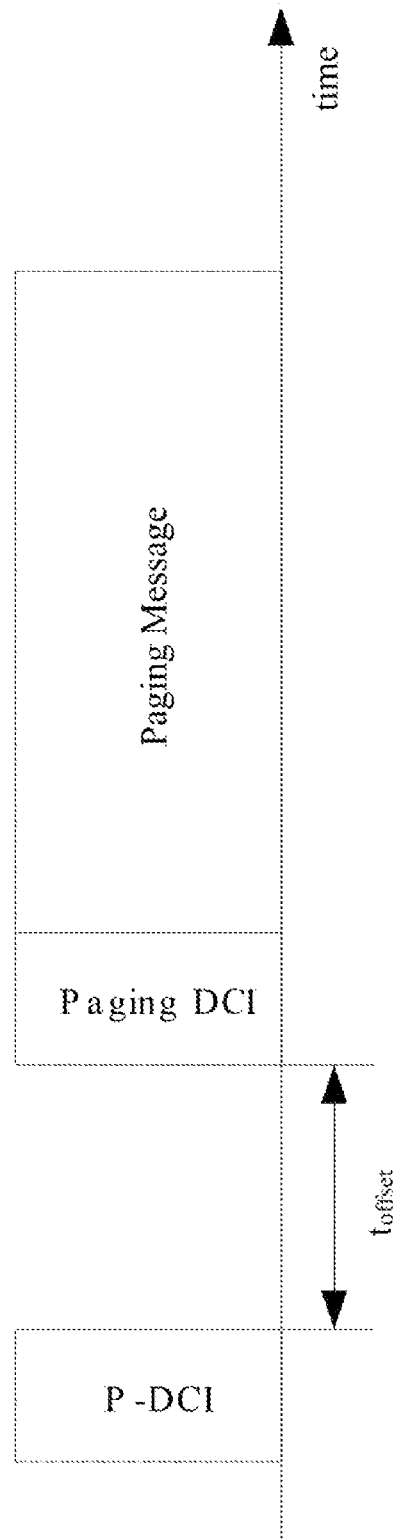

(Proposal 1) Power Saving Method for Transmitting and Receiving PS-DCI Before Transmission and Reception of Paging DCI In an embodiment of the present disclosure, a method of configuring P-DCI to be transmitted/received before a time at which paging DCI is transmitted/received is proposed. In the following description, the P-DCI transmitted and received in this structure is referred to as PS-DCI. FIG. 11 schematically illustrates an example of a transmission/reception time of PS-DCI considered in Proposal 1. When separate PS-DCI is configured as in Proposal 1, the power saving operation may be performed without significantly affecting the transmission of the paging DCI. Paging may be used for system information change, disaster notification, UE call, etc., and it is important to ensure backward compatibility that does not affect legacy UEs because it is designed for multiple UEs to monitor the same paging DCI at the same time. When separate PS-DCI is configured to provide power saving benefits to some UEs monitoring paging as suggested in Proposal 1, the UEs may obtain the power saving benefits through PS-DCI, and the paging DCI monitored by the other UEs that do not expect power saving may be operated in the same way.

(Proposal 1-1) Including, in the PS-DCI, a Short Message to be Transmitted in the Paging DCI It is proposed that the short message be included in PS-DCI. It is proposed that a short message to be transmitted in the paging DCI be included in the PS-DCI as an example of the short message included in the PS-DCI. The short message included in the PS-DCI may be determined based on at least a portion of the short message to be transmitted in the paging DCI. The short message included in the PS-DCI may be the same as at least a portion of the short message to be transmitted in the paging DCI.

The short message of the current NR standard may be used in the paging DCI for the purpose of providing BCCH modification information (systemInfoModification) or ETWS/CMAS notification (etwsAndCmasIndication), or instructing PDCCH monitoring to stop within the PO (stopPagingMonitoring).

The information in the short message may indicate that additional information is not included in the PDSCH carrying the paging message. Therefore, when the UE can determine that there is no information to be received/expected in the PDSCH through the PS-DCI, the operation of detecting the paging DCI again to check the short message may be skipped.

In the current standard, the paging DCI is transmitted based on the P-RNTI, and all UEs sharing the P-RNTI in the cell attempt to detect the paging DCI on the PO and receive a short message included in the paging DCI. Since the short message on the PDCCH carries cell common information (e.g., system information change, ETWS/CMAS, etc.) (unlike the paging message on the UE-specific PDSCH), it may be desirable for a UE other than the recipient to receive the short message. In this situation, when sub-grouping of UEs sharing the same PO is performed, and only some sub-groups wake up through PS-DCI to monitor the PO (i.e., receive paging DCI) as proposed above, the UEs of the remaining sub-groups may skip not only the PDSCH containing the paging message but also reception of paging DCI (PDCCH) containing a short message. For delivery of the short message, transmitting P-DCI and paging DCI individually for each sub-group may reduce the power saving effect and increase the signaling overhead. PS-DCI may be useful as a method to address the short message skip issue in UE sub-grouping. When the PS-DCI has a short message, UEs (of all subgroups) detecting the PS-DCI may detect at least a short message even if PO monitoring is skipped. In addition, the PS-DCI scheme may enable ETWS/CMAS instructions to be transmitted as quickly as possible and in various ways in disaster emergency/emergency situations.

Therefore, as in Proposal 1-1, a method for including information about the entirety or part of the short message in the PS-DCI to increase the power saving benefits of the UE is proposed.

The size of the short message field currently configured in the paging DCI of NR is 8 bits, and information of up to 3 bits may be used based on Rel-16 NR. In an embodiment of the present disclosure, when the PS-DCI including short message information of the paging DCI is transmitted, the size of the short message field configured in the PS-DCI and the type of information included are proposed as in Proposal 1-1-A.

Figure 15:
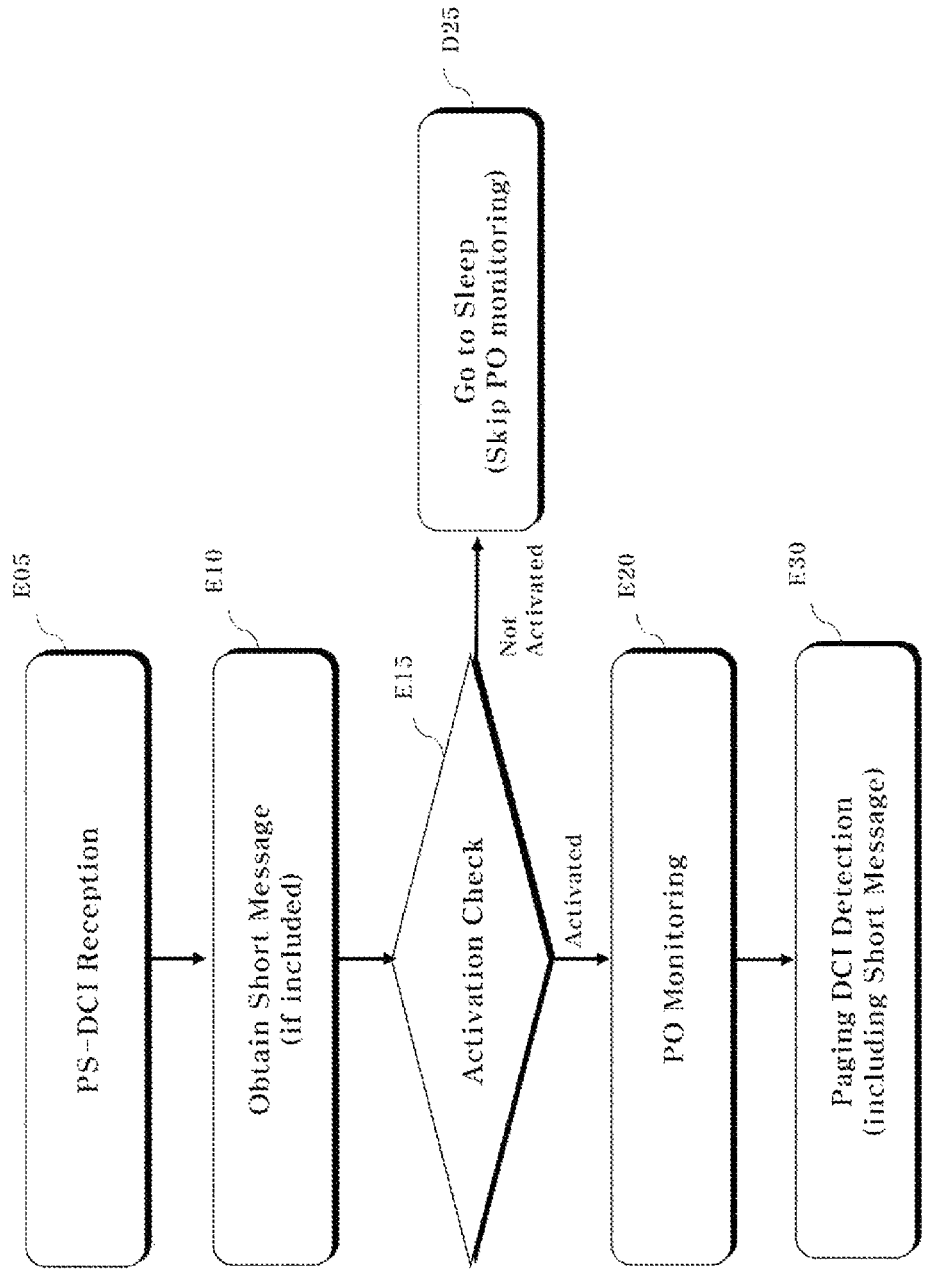

FIG. 15 is an implementation example of a UE operation related to PS-DCI. Referring to FIG. 15, a UE receives PS-DCI including a short message (E05) and acquires the short message by decoding (E10). The UE may perform a subsequent operation (e.g., refer to the above description including system information update) according to an instruction in the short message. The UE may acquire the short message from the PS-DCI regardless of whether the PO (or sub-group) thereof is activated in the PS-DCI.

The UE performs activation check (E15) to determine whether the PO (or sub-group) thereof is activated. When the PO is activated, the UE may monitor the PO based on a P-RNTI (E20) and detect paging DCI (E30). The paging DCI may include a short message. The short message included in the paging DCI may be related to the short message included in the PS-DCI.

(Proposal 1-1-A)

As a specific example of Proposal 1-1, a method in which an N-bit short message field is configured in the PS-DCI may be used. Here, N may be a value satisfying the condition of N<8. In this case, some bits in the short message field in the PS-DCI may contain all or part of the information contained in the short message field of the paging DCI, and some other bits may be considered to be in a reserved state. When the value of N is small, the overhead of the PS-DCI may be reduced and thus the PDCCH decoding reliability may be improved. On the other hand, when the value of N is large, the number of bits available in the reserved state may increase. The bits in this state may be advantageous in terms of forward compatibility of additional information to be introduced into the short message field of the paging DCI later.

As an example of using Proposal 1-1-A, the UE may be configured to expect that the information configuration included in the short message that the UE may expect in paging is included in the short message field of PS-DCI. For example, based on Rel-16 NR, the short message field of the paging DCI may consist of 8 bits, and the information that the UE may expect from the field may be up to 3 bits of systemInfoModification, etwsAndCmasIndicataion, and stopPagingMonitoring, and the other bits may all be considered a reserved state. When the proposed example is applied, based on Rel-16 NR, the UE may be configured to expect, in the field corresponding to the short message in the PS-DCI, the same information of 3 bits that may be expected through the short message of the paging DCI, and consider the remaining (N-3) bits to be in a reserved state.

Alternatively, only 2 bits of systemInfoModification and etwsAndCmasIndicataion may be included in the short message field of the PS-DCI and the remaining N-2 bits may be considered to be in the reserved state. Since 1 bit for stopPaging Monitoring is introduced to Rel-16 and is mainly used to support extended PO to allow multiple PDCCH monitoring occlusions in NR-U, PS-DCI may not support stopPagingMonitoring if not necessary.

The above examples describe the operation based on Rel-16 NR. Even when information is added to the short message, and the UE can expect L-bit information in the short message field of the paging DCI, the UE may expect the L-bit information in the short message region of the PS-DCI and consider the remaining N-L bits to be in the reserved state.

Alternatively, when Proposal 1-1-A is used, the UE may be configured to expect additional information provided by PS-DCI in the short message field of PS-DCI, along with the same information configuration as the short message that the UE may expect in paging. In this case, the additional information may be configured such that the size and information may be configured by higher layer signaling such as an SIB or an RRC message. For example, based on Rel-16 NR, the UE may expect information of up to 3 bits that may be expected in the short message of the paging DCI equally in the PS-DCI, and additional information that the Rel-16 NR UEs cannot expect may be configured through the RRC message. When the size of the additional information is set to M bits, the UE may expect that information is present in (3+M) bits in the short message field of the PS-DCI, and consider the remaining N-(3+M) bits as bits in the reserved state. In this case, when the configuration information about the additional information is not contained in the RRC message, the UE may expect that the short message field having the same configuration as the paging DCI will be configured in the PS-DCI. The operation described in the above example based on Rel-16 NR may also be applied when information is added to the short message later and thus the UE may expect information of L bits in total in the short message field of the paging DCI.

When the L-bit information is provided in the short message of the paging DCI, the UE may expect that the information is present in (L+M) bits in the short message field of the PS-DCI, and consider the remaining 'N-(L+M)' bits as bits in the reserved state.

When Proposal 1-1-A is used, N, the size of the short message field configured in the PS-DCI may have a value indicated by higher layer signaling. This configuration may be intended to reduce DCI overhead by minimizing the bits in the reserved state, while increasing the size N to include additional information in the short message field of the PS-DCI when the additional information is introduced in the Short Message of the paging DCI later. As a method of indicating N, a separate indicator indicating N may be introduced to explicitly express N through higher layer signaling. Alternatively, when there is an indicator indicating the configuration (or size) of the content of the short message of the paging DCI, it may be used such that N may be estimated implicitly.

Alternatively, when Proposal 1-1-A is used, N, the size of the short message field configured in the PS-DCI may have a fixed value according to the standard. This configuration may simplify the operation of the UE without generating a separate overhead. As an example of fixing the size of N, Proposal 1-1-A-a or Proposal 1-1-A-b disclosed below may be applied. The following examples are one of the embodiments for description, and the principle of the disclosure may be applied even when other values of N are used.

(Proposal 1-1-A-a) As a specific example of Proposal 1-1-A, a short message field of 8 bits equal to the size of the paging DCI may be configured in the PS-DCI. This may be an advantageous structure for ensuring forward compatibility that allows PS-DCI to support bits of the reserved state that are not currently in use when the bits are determined to be used in future releases. Given N=8, the same effect as the paging DCI may be expected in terms of forward compatibility because the short message field of the PS-DCI has the same size as the short message field of the paging DCI.

(Proposal 1-1-A-b) As a specific example of Proposal 1-1-A, a 2-bit short message field excluding the reserved state in the paging DCI may be configured in the PS-DCI. This may be an advantageous structure for reducing the size of the DCI of the PS-DCI to reduce the overhead for PDCCH transmission or improve PDCCH decoding reliability.

As described above, a short message of up to 3 bits may be configured in the short message based on the Rel-16 NR. Two of these bits may be used for systemInfoModification and etwsAndCmasIndictation, respectively, and may be information necessary for UEs of all service types. In addition, the 2 bits include information that is not associated with a subsequent PDSCH. Accordingly, when the 2 bits are included in the short message field of the PS-DCI, an advantageous effect for power saving may be obtained if the UE does not have information expected from the subsequent PDSCH. On the other hand, the remaining 1 bit (i.e., stopPaging Monitoring) is mainly used to indicate that the UE does not need to monitor a subsequent PDCCH monitoring occlusion in consideration of the characteristic situation in NR-U, which is an operation additionally introduced in Rel-16 NR. Accordingly, 1 bit indicating stopPagingMonitoring may not be included in PS-DCI short message field for the purpose of reducing overhead. The short message field of the PS-DCI may be configured based on the 2 bits used for systemInfoModification and etwsAndCmasIndication. Alternatively, the short message field of the PS-DCI may be determined as 3 bits by higher layer signaling. In a specific example in which the number of bits is determined by higher layer signaling, an explicit indicator for determining 2 bits or 3 bits may be used. Alternatively, 3 bits may be applied only in a situation where stopPaging-Monitoring can be operated meaningfully (i.e. nrofPDCCH-MonitoringOccasionPerSSB-InPO is configured). In the other case, 2 bits may be applied.

From a receiver perspective, when there are known bits in decoding a channel-coded signal, a benefit such as improved decoding reliability may be obtained depending on the receiver implementation. To improve this benefit, when short message fields are configured in the PS-DCI and the paging DCI corresponding to each other, a rule such as Proposal 1-1-B is proposed to enable a UE succeeding in decoding of the PS-DCI to use the decoded Short Message information for decoding of the paging DCI.

(Proposal 1-1-B)

As a specific example of Proposal 1-1, PS-DCI and paging DCI, which correspond to each other, may be configured such that bits indicating the same information in the short message fields always express the same state. In this case, the bits indicating the same information may refer to information included in both short message fields of the PS-DCI and the paging DCI according to the design of the PS-DCI. The information may include systemInfoModification, etwsAndCmasIndication and/or stopPagingMonitoring, based on Rel-16 NR. This configuration may be intended to use a result value of decoding of the PS-DCI in decoding the corresponding paging DCI when the UE succeeds in decoding the PS-DCI. The information about the BCCH modification and ETWS/CMAS notification included in the short message may be information that must be broadcast continuously for a certain period of time without changing instantaneously. Accordingly, in general circumstances, information that has similar characteristics to the information described above may be expected to maintain the same value between the PS-DCI and the paging DCI. When it can be assumed that the information is the same between two DCIs as in the proposed method, the UE may be allowed to use the same to improve the decoding reliability of the PDCCH on which the paging DCI is transmitted or to check false alarm.

The method proposed in Proposal 1-1-B may be extended and applied to a bit region corresponding to the reserved state. When there are bits in the reserved state in the short message field of PS-DCI, the same method may be applied to assume that the PS-DCI and the paging DCI have the same value. When N, the size of the short message field of the PS-DCI, is less than the size of the short message field of the paging DCI (i.e., N<8), the N sequence numbers may be configured as a set based on the sequence numbers assigned within the short message of the paging DCI, and the set may be included in the short message field of the PS-DCI. For example, it may be assumed that short messages assigned 1 to N based on index 1 (i.e., systemImpo-Modification) in the sequence in the short message of the paging DCI are present in the short message field of the PS-DCI.

In one characteristic situation to be considered when the method proposed in Proposal 1-1-B is used, there may be a modification period boundary for updating the SI message between the time when the PS-DCI is transmitted and the time when the paging DCI is transmitted. A modification period is a unit for notifying the time when an update of the SI message except for ETWS, CMAS and positioning assistance data is broadcast. When SI change is indicated by systemInfoModification, the UE may assume that the SI update will be performed in the next modification period. Accordingly, when the PS-DCI and the paging DCI are positioned in different modification periods, it is necessary to define DCI that is the basis for determining the value of systemImpoModification information, in order for the method of Proposal 1-1-B to be applied. As one method to address this issue, the information in the short message contained in the PS-DCI may be determined based on the information of the short message to be transmitted in the corresponding paging DCI. For example, when the SI update is scheduled in a modification period that includes the time when specific paging DCI will be transmitted, and is not scheduled in the next modification period, systemImpo-Modification included in the short message field of the paging DCI may indicate 0, and systemInfoModification of the corresponding PS-DCI may be set to 0 regardless of the transmission time.

When the structure of the PS-DCI proposed in Proposal 1 is used, the UG-field proposed in Proposal 0 may be included in the PS-DCI in order to increase the power saving gain of the UE. In an embodiment of the present disclosure, when short message information of the paging DCI and the UG-Field are configured together in the PS-DCI, the structure in which the UG-field is configured is proposed as in Proposal 1-1-C.

(Proposal 1-1-C)

As a specific example of Proposal 1-1, when the size of the short message field configured in the PS-DCI is N and the number of short messages actually used is L, the (N-L) bits that are reserved for short messages in the short message field may be used to present other information (hereafter, add-info). Specifically, the add-info may include a UE-group indication.

Figure 12:
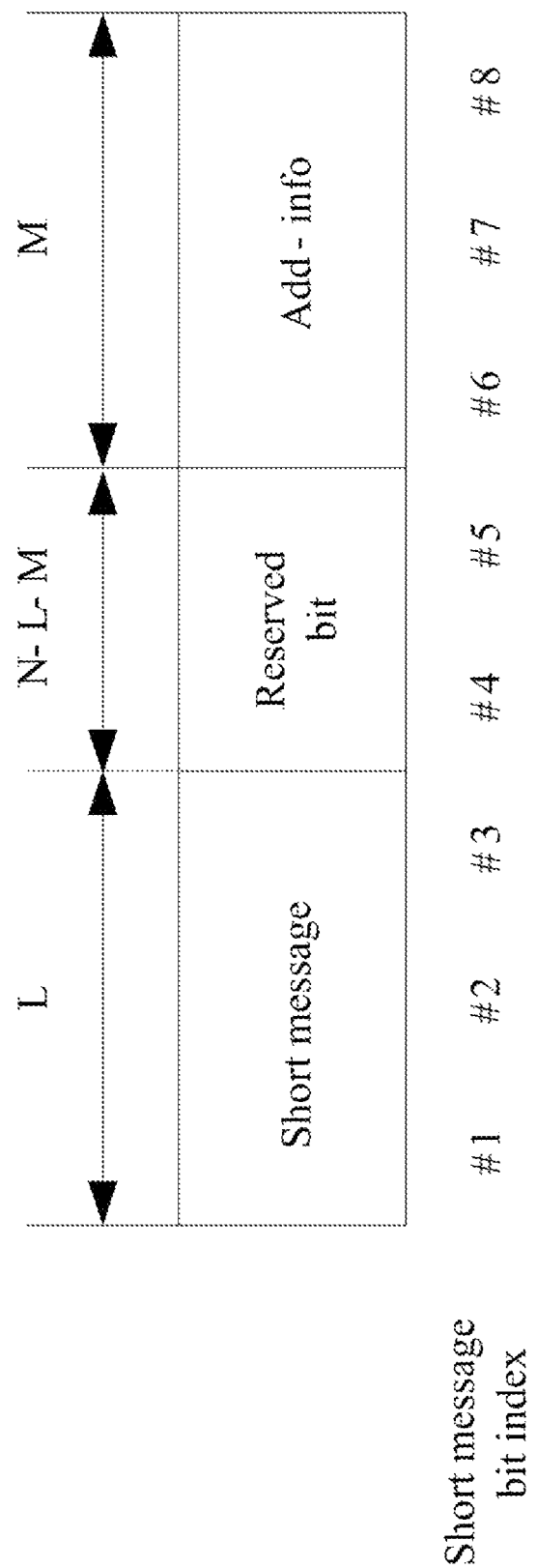
FIGS. 12 and 13 illustrate a short message according to an embodiment of the present disclosure.

Among the N-L bits, bits used for add-info may be M (≤N-L) bits, and the size of M may be configured by the BS. In this case, the UE may use L bits for short messages and M bits for add-info in the N-bit short message, and may assume that the remaining (N-L-M) bits are reserved bits. As a more specific example, when the bits constituting the short message field have an index, the short message field may be configured such that a short message of L bits, reserved bits of (N-L-M) bits, and add-info of M bits are arranged in this order. FIG. 12 schematically illustrates an example of the proposed method when N=8. The method may be intended to support UEs expecting different short message information with the same DCI. This may be advantageous for the purpose of forward compatibility to support functions that may be introduced in a future release without conflict.

Implementation Example of Proposal 1-1

The following description shows an example of configuring PS-DCI by applying Proposal 1-1. The following examples are limited forms to which the technologies proposed in the present disclosure may be applied, and the methods proposed in the present disclosure may be applied in various situations other than the described examples.

As an example of Proposal 1-1, P-DCI may be used to provide/obtain information about NR paging transmission and reception. In this case, the information configured in the P-DCI may include a UE-group indication and a short message. In this case, the size of the short message field configured in the PS-DCI is N, and may be configured/signaled as a value less than or equal to 8 by the BS. For example, the size of the short message field included in the PS-DCI is configurable by the network. As a configuration method, explicit signaling or implicit signaling may be used. For example, the size of the short message field may be inferred based on given parameters.

The network may signal information about the full size of the P/PS-DCI, the field configuration, or the DCI format (e.g., multiple DCI formats for P/PS-DCI to reduce the overhead of blind detection) (while signaling the size of the short message field in the PS-DCI).

Figure 13:
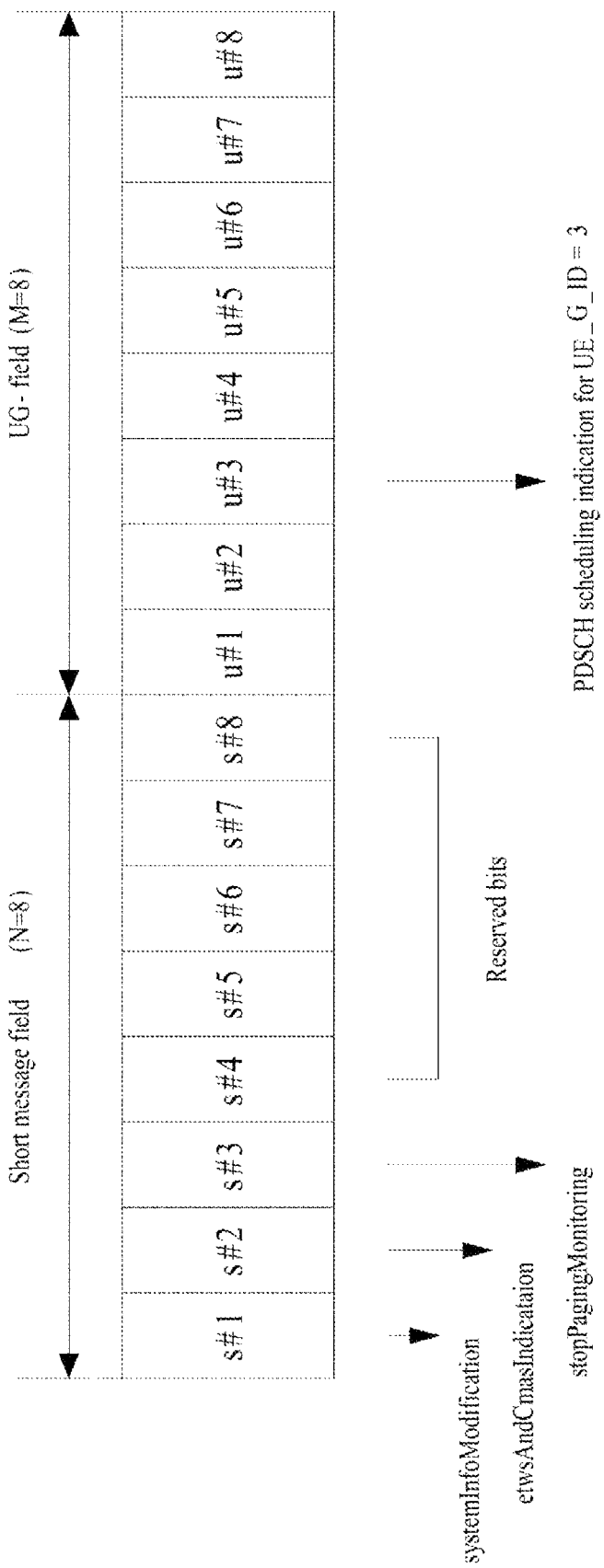

The UE may interpret $N_{UE}$ bits available to the UE among the N bits for interpretation of short message information. When N>Nue, it may be assumed that the remaining N-$N_{UE}$ bits are in the reserved state. In addition, the size of the UG-field configured in the PS-DCI may be M, and a structure that may be configured by the BS may be used. The UG-field may be configured as a bitmap of M bits. Each bit may correspond to one UE-group ID, and may be used to indicate whether PDSCH scheduling for each UE-group ID can be expected on the PO corresponding to the transmission of the received PS-DCI. In order to support the above operations, the BS may indicate supportability of the PS-DCI and the sizes of N and M through higher layer signaling such as the SIB. Subsequently, when there is a short message to be transmitted or a paging message to be transmitted to a UE, the BS may determine a PO on which the information is to be transmitted and transmit the information at the time of transmission of the PS-DCI corresponding to the PO. In order to support the above operations, the UE may obtain supportability of the PS-DCI and configuration information through higher layer signaling such as the SIB. Thereafter, the UE may monitor the PS-DCI at a predetermined transmission position of the PS-DCI. When the UE succeeds in detecting the PS-DCI and it is indicated to the UE that an operation related to the short message should be performed, the UE may perform the corresponding subsequent operation according to a predetermined rule. In addition, when the UE succeeds in detecting the PS-DCI and determines that PDSCH scheduling information about UE_G_ID thereof can be expected in the UG-field, the UE may attempt to detect the paging DCI at the position of the PO corresponding to the detected PS-DCI. However, in the case where the UE recognizes that PDSCH scheduling cannot be expected in a bitmap area corresponding to UE_G_ID thereof, the UE may determine that there is no need to attempt to detect paging DCI at the position of the corresponding PO even when the UE succeeds in detecting the PS-DCI. FIG. 13 schematically shows an example of configuration of a DCI field when the above example is applied with N=8 and M=8. The example in the figure shows that the UE has capability for three short messages, and thus shows that five bits are assumed to be reserved bits. In the example of FIG. 13, it is assumed that UE_G_ID is 3 for the UE, and accordingly the UE uses the third bit in the UG-field.

(Proposal 1-2) Including, in the PS-DCI, a Short Message Indicator to be Transmitted in the Paging DCI One example of the present disclosure proposes a method of including, in PS-DCI, a short message indication to be transmitted in corresponding paging DCI as in Proposal 1-2. The paging DCI defined in the NR standard has a 2-bit short message indicator. The short message indicator is used to dynamically indicate whether a short message is included in the paging DCI in which PDSCH scheduling information is transmitted. When the BS does not have short message information to transmit, the BS may disable the short message field using the short message indicator. In this case, the UE may operate, considering the short message field as reserved bits based on the received short message indicator information. Similarly, even when a short message field is configured in the PS-DCI, there may be a time when there is no short message information to be transmitted by the BS. Considering this situation, one example of the present disclosure proposes a dynamic indication method similar to paging DCI by introducing a short message indicator in PS-DCI as in Proposal 1-2.

When the size of the Short Message indication field configured in the paging DCI of NR is 2 bits, 01, 10, and 11, which represent the statuses of the bit field based on Rel-16 NR, are used to indicate "Only scheduling information for paging is present in the DCI," "Only short message is present in the DCI," and "Both scheduling information for Paging and short message are present in the DCI," respectively, and 00 is set to the reserved state. In an embodiment of the present disclosure, an operation method when the size of the Short Message indicator field included in the PS-DCI is configured to be 2 bits as the paging DCI is proposed as in Proposal 1-2-A.

(Proposal 1-2-A)

As a specific example of Proposal 1-2, a 2-bit Short Message indicator field may be configured in the PS-DCI. The 2-bit Short Message indicator may have the same size as the Short Message indicator configured in the paging DCI and may be intended to support the same operation as the paging DCI, to utilize all four states in total, or to support a new Short Message related operation of the paging DCI, which may be introduced later in terms of forward compatibility. A specific example of Proposal 1-2-A may be a combination of one or more of Proposal 1-2-A-a, Proposal 1-2-A-b, and Proposal 1-2-A-c proposed below.

(Proposal 1-2-A-a) As a specific example of Proposal 1-2-A, the 2-bit Short Message indicator used in PS-DCI may be used to indicate whether a short message is present and whether information related to scheduling of paging is included. Table 5 shows an example of Proposal 1-2-A-a in the form of a table. The information that may be presented through the short message indicator of the PS-DCI may be the same as the information that may be presented through the short message indicator of the paging DCI.

As a specific example of Proposal 1-2-A-a, the UE may be configured not to expect the case where the 2-bit indicator indicates the state of '00'. This is the same definition of operation as in the case where the short message indicator of the paging DCI indicates the state of '00'. This configuration may be beneficial in terms of forward compatibility for operation reflecting the case where the state of '00' is used in the short message indicator of the paging DCI in the future. When the BS knows that a UE that is the target of the paging message or the short message does not expect the state of '00', it may determine the information of the short message indicator using a state other than '00'.

As a specific example of Proposal 1-2-A-a, when the 2-bit indicator indicates the state of '01', the UE may be configured not to expect short message information to be carried in the short message field of the PS-DCI. In this case, the UE may expect that information (e.g., UE_G_ID indication) that may be carried in a field other than the short message field in the PS-DCI can be included in the DCI. In this case, the UE may assume that the bits of the short message field are in the reserved state. This may be intended to define the same operation as when the short message indicator of the paging DCI is in the state of '01' to equally support the operation for the case of the paging DCI and increase forward compatibility when the operation is newly introduced in the future. Alternatively, the bits of the short message field may be used to indicate information for other purposes. For example, the area of the short message field may be used to provide information for indicating a UE-group. When there is a separate field configured in the PS-DCI to indicate UE_G_ID, bits in the short message field may be additionally used to subdivide the UE-group. This configuration may increase the transmission efficiency of control data by additionally using the reserved bits for another purpose. Also, when the other purpose is UE grouping, the configuration may be advantageous in terms of power saving because unnecessary wake-up operation of the UE may be reduced by subdividing the UE-group.

As a specific example of Proposal 1-2-A-a, when the 2-bit indicator indicates the state of '10', the UE may be configured to assume that the PS-DCI contains Short Message information, and may also be configured not to expect (or configured to recognize that there is no need to monitor) the transmission of the paging DCI corresponding to the transmission of the PS-DCI. In this case, the UE may recognize that a short message is included in the short message field contained in the PS-DCI and interpret the short message information according to a predetermined rule. Here, the predetermined rule for the information carried in the short message field may be one of the methods proposed in Proposal 1-1.

As a specific example of Proposal 1-2-A-a, when the 2-bit indicator indicates the state of '11', the UE may assume that the PS-DCI contains Short Message information and that the PS-DCI contains information (e.g., UE_G_ID indication) that may be carried in a field other than the short message field. When the information that may be carried in the other field is information related to UE_G_ID, and the UE is instructed to monitor paging DCI for UE_G_ID expected by the UE, the UE may check the information contained in the short message field and monitor the PO corresponding to the transmission of the PS-DCI. When the information that may be carried in the other field is information related to UE_G_ID, and monitoring of the paging DCI for UE_G_ID expected by the UE is deactivated, the UE may check the information contained in the short message field and assume that it is not necessary to monitor the PO corresponding to the transmission of the PS-DCI. Here, the information carried in the short message field may be determined according to one of the methods proposed in Proposal 1-1.

According to the method of Proposal 1-2-A-a, the configuration and operation of the Short Message indicator configured in the PS-DCI are the same as or similar to the configuration and operation of the Short Message indicator configured in the paging DCI. Further, when a method of operating the short message of the paging DCI is added in the future, it may be easy to add the same/similar operation to the PS-DCI.

TABLE 5

| Bit field | Short message indicator |
|---|---|
| 00 | Reserved |
| 01 | Only scheduling information for Paging is present in the DCI |
| 10 | Only short message is present in the DCI |
| 11 | Both scheduling information for Paging and short message are present in the DCI |

(Proposal 1-2-A-b) As a specific example of Proposal 1-2-A, information that may be included in the short message field contained in the PS-DCI may be divided into three groups and the size of each group may be determined by the state of the 2-bit short message indicator. For example, the information in the three divided groups may be actual Short Message, UE-group indication, and Info_Others. Here, the actual Short Message represents the bits used to provide short message information in the short message field, and Info_Others represents a set of information that may be carried in the short message field other than the information of the Short Message and UE-group indication. Table 6 shows a specific example in which Proposal 1-2-A-b is applied in a situation where the short message field is N bits. In the example in Table 6, A, A', B, and B' may have arbitrary integer values, and A, B, and A'+B' may all be less than N. Here, A, A', B, and B' may have values predetermined by a standard, or may be values configured by higher layer signaling such as the SIB. In the example of Table 6, the sizes of bits are indicated by different symbols for description. However, the proposed method may be applied even when two or more of A, A', B, and B' have the same value.

In Proposal 1-2-A-b, a specific example of configuration of a bit field for the purpose of the actual Short Message may be a combination of one or more of the methods proposed in Proposal 1-1. When the UE determines that the size of the bit field for the purpose of the actual Short Message is 0 bits through detection of PS-DCI, it may not expect the operation related to the short message any longer. When the UE determines that the size of the bit field for UE-group indication is 0 bits through detection of the PS-DCI, the UE may not expect transmission of the PDSCH to be scheduled in the paging DCI corresponding to the PS-DCI.

In Proposal 1-2-A-b, the type of information contained in the bit field for Info_Others and the size of each piece of information may be determined by the state of the Short Message indicator. This may be suitable for the purpose of maximizing the amount of information that may be delivered through Info_Others according to the situation while ensuring the amount of information of two different types (i.e., actual Short Message and UE-group indication). In addition, when the size of the bit field allocated to Info_Others is C1 bits and the maximum total amount of information that the UE may expect from Info_Others is C2 bits in any state of the short message indicator, the UE may assume that C1-C2 bits remaining unused in the Info_Others bit field for the purpose of information provision are reserved bits. This configuration may be suitable for the purpose of determining a rule for interpretation of bits that the UE does not expect and considering forward compatibility in preparation for future extension and use of the bit field of C1-C2 bits for other purposes.

When Proposal 1-2-A-b is used, the information related to the UE-group indication is separately configured in a bit field other than the short message field (hereinafter referred to as information A), and the size of the UE-group indication bit field in the short message field is not zero (hereinafter referred to as information B), the UE-group indication information may be composed of a combination of information A and information B. For example, information A may be composed of G1 bits in a situation where one UE-group can be distinguished per bit. In this case, when information B is 0 bits, the total number of UE-groups that may be distinguished through the PS-DCI may be G1. When information B is G2 bits, the total number of UE-groups that may be distinguished through the PS-DCI may be G1+G2 bits.

With the method of Proposal 1-2-A-b, the short message field configured in the PS-DCI may be used to transmit the Short Message and information of the UE-group indication together, and information about the UE-group may be provided according to the situation even when a separate UE-group indication field is not configured using a bit other than the short message field. In addition, to provide additional information that may be introduced for the purpose of power saving, the BS may use the Info_Others area and adjust the size of each field according to the situation.

TABLE 6

Short message indicator

| Bit field | Actual short message | UE group indication | Info_Others |
|---|---|---|---|
| 00 | 0 bit | 0 bit | N bit |
| 01 | 0 bit | B bit | N-B bit |
| 10 | A bit | 0 bit | N-A bit |
| 11 | A' bit | B' bit | N-A'-B' bit |

(Proposal 1-2-A-c) As a specific example of Proposal 1-2-A, when the Short Message indicator field and additional bit fields (hereinafter Other_bit_field) other than the Short Message indicator are present in the PS-DCI, and it is indicated by the included short message indicator that there will be no PDSCH scheduling for UEs monitoring the PS-DCI, the UE may assume that the Other_bit_field is reserved bits. In this case, the situation where it is indicated that there will be no PDSCH scheduling may correspond to the state of '10' of the Short Message Indicator in Proposal 1-2-A-a and the state of '00' or '10' of the Short Message Indicator in Proposal 1-2-A-b.

Proposal 1-2-A-c1 may be applied only when there is no separate operation defined for a UE determining that PS-DCI does not have information related to PDSCH scheduling through the Short Message indicator, or when there is a separate operation defined for the UE but the UE has not received an indication enabling the operation from the BS (or receives an indication disabling the operation).

In contrast, a rule for an operation in the case where the UE determines that the PS-DCI has no information related to PDSCH scheduling through the Short Message indicator may be supported. In this case, when it is indicated by the short message indicator in the PS-DCI that there is no PDSCH scheduling for UEs monitoring the PS-DCI, the UE may use the Other_bit_field for a purpose other than the UE-group indication. In this case, a predetermined rule may be applied only when the UE receives an indication enabling the above operation (or does not receive an indication disabling the operation).

Proposal 1-2-A-c1 may cause the UE to assume that a bit field that is not defined based on the supported standard is in the reserved state, thereby enabling the BS to simultaneously support UEs capable of using the bit field.

When the PS-DCI is used to indicate whether the paging is transmitted, the reliability of decoding of the PS-DCI may affect success in receiving the paging by the UE. As a method for increasing reliability of decoding of the PS-DCI, minimizing the bit size of the PS-DCI needs to be considered. In an example of the present disclosure, an operation to be performed when the size of the short message indicator field included in the PS-DCI is configured to be 1 bit is proposed as in Proposal 1-2-B.

(Proposal 1-2-B)

As a specific example of Proposal 1-2, a 1-bit short message indicator field may be configured in the PS-DCI. In this case, the 1 bit may be used to indicate whether the PS-DCI contains information of the short message. For example, when the 1 bit is in state '0', it may indicate that the PS-DCI does not have short message information. When the PS-DCI is in state '1', it may indicate that the PS-DCI includes short message information. Table 7 shows an example of the operation proposed in Proposal 1-2-B.

When Proposal 1-2-B is applied and the presence of a short message in the PS-DCI is indicated by the 1-bit short message indicator, the UE may obtain short message information through a short message field configured in the PS-DCI. In this case, the method proposed in Proposal 1-1 may be used as a method by which the short message field is configured and the UE obtains information therethrough.

When Proposal 1-2-B is applied and the absence of the short message from the PS-DCI is indicated by the 1-bit short message indicator, the UE may assume that the short message field is not present in the PS-DCI or that the existing short message field will not be used for the delivery of the short message. In this case, the UE may consider the bits included in the existing short message field to be in the reserved state or assume that the bits will be used for a purpose other than short message transmission. As an example of a method in which the existing short message field is used for another purpose, the short message field may be used for UE-group indication. As another example, the short message field may be used to provide information related to transmission of a reference signal (e.g., CSI-RS/TRS, DMRS, etc.) that may be transmitted for a purpose such as T/F tracking or measurement. In this way, it may be determined by the short message indicator that there is no short message in the existing short message field. In this case, the short message field may be used for another purpose only when the UE has a related capability or the UE obtains a signal (e.g., higher layer signaling) indicating that the UE supports related operations from the BS.

When Proposal 1-2-B is applied and a bit field for indicating UE-group indication is present in the PS-DCI, the UE may monitor the PO corresponding to the PS-DCI to receive the PDSCH only when it is indicated through the information in the UE-group indication bit field that there will be scheduling corresponding to UE_G_ID of the UE. When the UE does not receive indication for scheduling corresponding to UE_G_ID thereof or receives indication that the scheduling is not present, the UE may not to expect PDSCH scheduling therefor on the PO associated with the PS-DCI.

According to the method of Proposal 1-2-B, the 1-bit operation of the 2-bit short message indicator of the paging DCI to indicate the presence of PDSCH scheduling information is replaced through the UE-group indication bit field. Accordingly, DCI bit overhead may be reduced. In addition, Since the remaining 1 bit is used to allow the short message field to be used for other purposes when a short message is not present in PS-DCI, the benefit of resource utilization may be increased.

TABLE 7

| Bit field | Short message indicator |
|---|---|
| 0 | Short message is not present in the DCI |
| 1 | Short message is present in the DCI |

(Proposal 2) Adding the Function of P-DCI to Paging DCI

In an example of the present disclosure, a method for supporting a power saving operation for UEs having a power saving capability by redesigning some bits of paging DCI as in Proposal 2 is proposed. When the BS has a lot of DL traffic to transmit or the operating PO has a high density, transmitting an additional signal/channel for power saving may not be appropriate in that the method may increase network overhead. Currently, based on NR Rel-16, paging DCI has reserved bits that the UE always assumes and may assume according to conditions. NR UEs supporting the standards up to Rel-16 assume that the reserved states may be represented in any bit in the process of decoding paging DCI, and do not expect to obtain information through the reserved bits. In an example of the present disclosure, operations for supporting the power saving operation of the UE by utilizing the reserved bits present in the paging DCI are proposed. The methods proposed in Proposal 2 may not generate a separate network overhead because they support the power saving operation through paging DCI used for legacy UEs.

(Proposal 2-1) Power Saving According to the State of the Short Message Indicator in the Paging DCI In an example of the present disclosure, it is proposed that power saving information be included in paging DCI as in Proposal 2-1, and interpretation of the paging DCI of the UE including the method for UE grouping be is determined based on the state of the short message indicator transmitted together with the DCI. Based on the current Rel-16 NR, the short message indicator included in the paging DCI is configured in two bits and is used to deliver one reserved state and three pieces of significant information (i.e., Short Message only, PDSCH scheduling information only, both Short Message and PDSCH scheduling information). In this case, depending on each state indicated by the short message indicator, some bit fields in the paging DCI may be considered as reserved bits. In this case, the positions and number of reserved bits may vary depending on each state of the short message indicator. Accordingly, an appropriate or expressable power saving operation may vary according to each state of the short message indicator. In an example of the present disclosure, in consideration of such conditions, a power saving operation method according to the state of the short message indicator as in Proposal 2-1 is proposed. In each specific example according to the state of the short message indicator, Proposals 2-1-A, 2-1-B, 2-1-C, and 2-1-D proposed below may be used. Each method may be used independently or one or more methods may be used in combination. When there is a state of the short message indicator field that is not covered by the combinations of the proposed methods, the state of the short message indicator field may conform to the operation of the short message indicator state of a general UE (i.e., a UE that does not support power saving using paging DCI). For example, when the power saving operation is defined only for the states of '01', '10', and '11' of the short message indicator, and a separate definition for the state '00' is not included, the operation in the state '00' may conform to the operation of the general UE (i.e., a NR UE that supports the same release while not supporting power saving using the paging DCI).

(Proposal 2-1-A)

As a specific example of Proposal 2-1, when the short message indicator of the paging DCI is in the state '00', the UE may expect that the short message field is not present in the paging DCI, or that the short message field is not used to deliver the short message. In this case, the UE may expect other information for power saving in place of the short message.

As a specific example of Proposal 2-1-A, when the short message indicator of the paging DCI is in the state '00', the short message field of the paging DCI may be used for UE-group indication information. When the short message indicator is in the state '00', the UE may expect that the PDSCH scheduling information for any UE-group may be included in the paging DCI. When it is indicated, through the UE-group indication information, that the UE should receive the PDSCH, the UE may obtain the PDSCH scheduling information through the paging DCI and then perform an operation to receive the PDSCH. When the UE recognizes that there is no PDSCH transmission for UE_G_ID thereof in the UE-group indication information, the UE may assume that the UE does not need to attempt to receive the PDSCH. In this case, unnecessary power consumption may be reduced by skipping the operation of receiving the PDSCH.

As a specific example of Proposal 2-1-A, when the short message indicator of the paging DCI is in the state '00', fields for PDSCH scheduling information defined in legacy paging DCI (e.g., paging DCI used by an NR UE that does not support power saving using paging DCI) may be applied in the same way in the area of PDSCH scheduling information in the paging DCI. The area of the PDSCH scheduling information may include a frequency domain resource assignment field, a time domain resource assignment field, a VRB-to-PRB mapping field, a modulation and coding scheme field, and a TB scaling field, which may be applied when DCI format 0_1 is scrambled with P-RNTI.

With the method proposed in Proposal 2-1-A, legacy UEs may be prevented from attempting to obtain PDSCH information by the paging DCI during PDSCH scheduling for some UEs capable of UE grouping using paging DCI. Therefore, the power saving effect of legacy UEs together with UEs capable of power saving may be obtained.

(Proposal 2-1-B)

As a specific example of Proposal 2-1, when the short message indicator of the paging DCI is in the state '01', the UE may expect that the short message field of the paging DCI is not used to deliver a short message. In this case, the UE may expect other information for power saving in place of the short message.

As a specific example of Proposal 2-1-B, when the short message indicator of the paging DCI is in the state '01', the short message field of the paging DCI may be used for UE-group indication information. The UE may expect that the PDSCH scheduling information for any UE-group may be included in the paging DCI. When it is indicated, through the UE-group indication information, that the UE should receive the PDSCH, the UE may obtain the PDSCH scheduling information through the paging DCI and then perform an operation to receive the PDSCH. When the UE recognizes that there is no PDSCH transmission for UE_G_ID thereof in the UE-group indication information, the UE may assume that the UE does not need to attempt to receive the PDSCH. In this case, unnecessary power consumption may be reduced by skipping the operation of receiving the PDSCH.

As a specific example of Proposal 2-1-B, when the short message indicator of the paging DCI is in the state '01', fields for PDSCH scheduling information defined in legacy paging DCI (e.g., paging DCI used by an NR UE that does not support power saving using paging DCI) may be applied in the same way in the area of PDSCH scheduling information in the paging DCI. The area of the PDSCH scheduling information may include a frequency domain resource assignment field, a time domain resource assignment field, a VRB-to-PRB mapping field, a modulation and coding scheme field, and a TB scaling field, which may be applied when DCI format 0_1 is scrambled with P-RNTI.

With the method proposed in Proposal 2-1-B, PDSCH may be scheduled simultaneously for a UE capable of UE grouping and legacy UEs which share the same PO. When the state of the short Message indicator is '01', the legacy UEs assume that the short message field is a reserved bit, and is therefore not affected by the provision of UE grouping-related information using the state (Proposal 2-1-C)

As a specific example of Proposal 2-1, when the short message indicator of the paging DCI is in the state '10', a short message may be carried in the short message field of the paging DCI, and the UE may expect PDSCH scheduling information for UEs capable of UE grouping through the paging DCI.

(Proposal 2-1-C-a) As a specific example of Proposal 2-1-C, when the short message indicator of the paging DCI is in the state '10', the short message field in the paging DCI may be used for UE-group indication information along with the short message information. Based on the NR Rel-16 standard, up to three pieces of short message information are defined to be included in the paging DCI, and five bits that have not yet been defined are assumed by the UE as reserved bits. Proposal 2-1-C-a proposes a method of using the reserved bits for UE-group indication.

In a specific embodiment of Proposal 2-1-C-a, when the number of short messages actually used is L, M bits in the short message field may be used for UE-group indication. M may be configured by the BS. Here, M should satisfy the condition of M≤8-L, and the remaining 8-L-M bits may be assumed to be reserved bits. As a more specific example, in consideration of indexes for the bits constituting the short message field, the short message field may be configured such that a short message of L bits, reserved bits of N-L-M bits, and a UG-field of M bits are arranged in this order.

In a specific embodiment of Proposal 2-1-C-a, a UE expecting PDSCH scheduling according to UE-group indication information may receive PDSCH by applying PDSCH scheduling information contained in the paging DCI.

According to Proposal 2-1-C-a, the reserved bits of the short message field are utilized, and therefore PDSCH scheduling information having the same level of flexibility as the legacy UE may be transmitted and received.

(Proposal 2-1-C-b) As a specific example of Proposal 2-1-C, when the short message indicator of the paging DCI is in the state '10', the short message field of the paging DCI may be used only for short message information, and the remaining bit fields may be used to provide UE-group indication and PDSCH scheduling information. When the short message indicator is in the state '10', UEs that do not expect power saving using the paging DCI may expect only transmission of a short message through the DCI, and does not expect PDSCH scheduling information. Based on these characteristics, Proposal 2-1-C-b proposes a method of redesigning information such that the scheduling information field provides UE-group indication and PDSCH scheduling information at the same time when legacy UEs do not expect information.

According to Proposal 2-1-C-b, the short message field is maintained. Accordingly, when some bits of the short message field are added in the future, they may be easily supported. Therefore, it is easy to obtain a benefit in terms of forward compatibility.

The methods proposed in Proposal 2-1-C may be used when notification of short message information is needed for both a UE capable of UE grouping and legacy UEs which share the same PO. In addition, legacy UEs may be prevented from attempting to obtain PDSCH information by the paging DCI during PDSCH scheduling for some UEs capable of UE grouping using paging DCI. Therefore, the power saving effect of legacy UEs together with UEs capable of power saving may be obtained.

(Proposal 2-1-D)

As a specific example of Proposal 2-1, when the short message indicator of the paging DCI is in the state '11', a short message may be carried in the short message field of the paging DCI, and the UE may expect PDSCH scheduling information for UEs capable of UE grouping through the paging DCI.

As a specific example of Proposal 2-1-D, when the short message indicator of the paging DCI is in the state '11', the short message field in the paging DCI may be used for UE-group indication information along with the short message information. Based on the NR Rel-16 standard, up to three pieces of short message information are defined to be included in the paging DCI, and five bits that have not yet been defined are assumed by the UE as reserved bits. Proposal 2-1-C-a proposes a method of using the reserved bits for UE-group indication.

In a specific embodiment of Proposal 2-1-D, when the number of short messages actually used is L, M bits in the short message field may be used for UE-group indication. M may be configured by the BS. Here, M should satisfy the condition of M≤8-L, and the remaining 8-L-M bits may be assumed to be reserved bits. As a more specific example, in consideration of indexes for the bits constituting the short message field, the short message field may be configured such that a short message of L bits, reserved bits of N-L-M bits, and a UG-field of M bits are arranged in this order.

In a specific embodiment of Proposal 2-1-D, a UE expecting PDSCH scheduling according to UE-group indication information may receive PDSCH by applying PDSCH scheduling information contained in the paging DCI.

According to Proposal 2-1-D, the reserved bits of the short message field are utilized, and therefore PDSCH scheduling information having the same level of flexibility as the legacy UE may be transmitted and received. In addition, PDSCH scheduling information may be provided along with the short message to both a UE capable of UE grouping and legacy UEs e.

(Proposal 2-2) Adding a Power Saving Indicator to the Short Message Field of Paging DCI In an example of the present disclosure, it is proposed that an indication bit for a power saving operation be added to the short message indicator included in the paging DCI, and the power saving related operation be determined by the power saving indication bit, as in Proposal 2-2. Based on NR Rel-16, the short message field of paging DCI consists of 8 bits and operation of 3 bits among the bits is defined. When the UE recognizes that short message information is included by the short message indicator field, the UE may expect related information defined in the area of the 3 bits and assume that the remaining 5 bits to be reserved bits. Also, when the UE recognizes that the short message information is not included by the short message indicator field, the UE may operate assuming all the 8 bits to be reserved bits. The reserved bits are available when there is an additional need for the BS to provide information not included in the paging message to multiple unspecified targets. Accordingly, a benefit may be expected in terms of forward compatibility. Therefore, using all (or multiple) reserved bits in the short message for UE grouping may be disadvantageous for extensibility of short message information that may be generated in the future. To address this issue while providing UE grouping information using the short message field, Proposal 2-2 proposes that a power saving indicator bit be added to the short message field and whether the paging DCI contains power saving related information be indicated according to the state of the power saving indicator bit. As a specific example of the power saving related information, a UE-group indicator for providing information on UE_G_ID of the UE may be included. While UE grouping indication is mainly described in Proposal 2-2 for simplicity, the principle of the disclosure may be applied to the power saving operation in other methods.

As a specific example of Proposal 2-2, the D-th bit of the short message field (i.e., a bit with an index #D) may be defined to be used for the power saving indicator. In this case, the information indicated by the power saving indicator may be about whether the UG-field is configured in the short message field. When the power saving indicator indicates that the UE-group indication information of the M-bit size is provided in the short message field, the UE may assume that the D+1-th to D+M-th bits in the short message field are configured as a UG-field. On the other hand, when the power saving indicator indicates that the UE-group indication information is not included in the short message field, the UE may assume that the D+1-th to 8th bits in the short message field are determined by a predetermined rule. Here, the predetermined rule may be that, if there is another short message defined between the D+1-th and 8th bits, the defined message should be followed. and that bits without a separately defined short message are assumed as reserved bits.

In the proposed method, the value of D may be predetermined by a standard. For example, it may be set to 4. This may be intended to ensure three short messages used based on NR Rel-16. Specifically, for a system in which the third bit used for stopPagingMonitoring is not applied, D may be exceptionally set to 3. This may be intended to add additional available short message resources for a system the does not require the information because the third bit used for stopPagingMonitoring has been introduced mainly to support the service scenario of NR-U.

As another example of determining a value of D in the proposed method, D may be configured to have a value of 1. This may be intended to increase the number of UE-groups by using the entire short message field for UE-group indication when the state having no short message delivery (i.e., the state of '00' or '01') is indicated by the short message indicator.

The method proposed in Proposal 2-2 may support UE grouping indication using the short message field, while satisfying the backward compatibility. The method is also advantageous for forward compatibility as it allows the bits of the short message field to be used for other purposes in the future.

(Proposal 2-3) Power Saving Method Using Reserved Bits that are not Included in the Short Message Field of the Paging DCI An example of the present disclosure proposes that the power saving operation be supported by using reserved bits (i.e., an independent bit area not present in the short message field) present in paging DCI, as in Proposal 2-3. Based on the NR Rel-16 standard, paging DCI has a total of 6 reserved bits (hereinafter, add-reserved bits) that are configured independently of the short message field. The add-reserved bits are always present without being influenced by the short message indicator, and d not affect the short message information. Therefore, they may ensure a certain size regardless of the state of the short message indicator. In addition, even when additional information is introduced into the short message field in the future, the amount of information available may be supported at the same level. Proposal 2-3 proposes that power saving information be provided using the add-reserved bits. For example, a UE-Group indication may be used for the power saving information. While UE grouping indication is mainly described in Proposal 2-3 for simplicity, the principle of the disclosure may be applied to the power saving operation in other methods.

In Proposal 2-3, the number of bits used for the addition-reserved bit to be used for UE-group indication may be predetermined by the standard. This may not cause a separate signaling overhead. For example, when six bits are used, up to six UE-groups may be distinguished using the add-reserved bit field. Alternatively, the bit size may be configured by the BS. When there is no configured value, a default value (e.g., 0 bit or no configuration of UG-field) may be applied. This may be intended to support future introduction of an additional function in paging DCI. In the opposite case, all bits may be used for UE-group indication.

(Proposal 2-3-A)

As a specific example of Proposal 2-3, considering a case where R bits in the add-reserved bit field may be configured as a UG-field (hereinafter UG-field-1) and S bits may be configured as a UG-field (hereinafter UG-field-2) in the short message field, Proposal 2-3-A proposes a method of performing UE-group indication using the two areas. This method may be intended to increase the number of UE-groups that may be expressed compared to the case of presenting UE-group information only with the add-reserved bit area. Specifically, the UG-field-2 may be configured by a combination of one or more of the methods proposed in Proposal 2-1 and Proposal 2-2.

In Proposal 2-3-A, whether to use the area of UG-field-2 may be determined according to conditions. In addition, even when the area of the UG-field-2 is used, the size of the UG-field-2 may vary depending on the conditions. This may be intended to consider the size of the available UG-field-2 according to conditions such as the information indicated in the short message indicator field and/or the size of a field configurable in the short message field as described in Proposals 2-1 and 2-2. For example, when 2 bits of the short message indicator are '01' and Proposal 2-3-A is applied, the size of UG-field-2 may be set to S=8 bits. Also, when the 2 bits of the short message indicator are '10' or '11' and Proposal 2-3-A is applied, the size of UG-field-2 may be set to S=4 bits. The above example of the values of S is an example in which a proposed method operates, and the principle of the present disclosure may be equally applied even when S set to another size is used.

As a specific example of Proposal 2-3-A, the R bits and the S bits may be configured as a single UG-field (hereinafter, UG-field-3). For example, when it is possible to express in 1 bit whether there is PDSCH scheduling corresponding to one UE_G_ID, a total of R+S UE-groups may be distinguished through UG-field-3. This may be intended to increase the benefit of power saving through UE grouping by increasing the total number of expressable UE-groups.

Alternatively, as another specific example of Proposal 2-3-A, characteristics of UE-groups or UE_G_IDs indicated by UG-field-1 and UG-field-2 may be configured to be different from each other. For example, UG-field-1 may be configured to perform UE-group indication using UE_G_ID based UE_G_ID (e.g., the method proposed in Proposal 0-2-A above), and UG-field-2 may be configured to perform UE-group indication based on UE_G_ID configured separately by the BS (e.g., the method proposed in Proposal 0-2-B). This may be intended to design the two types of UE-group indication methods to be simultaneously supported using one paging DCI. Also, when the available size of UG-field-2 varies depending on the situation, UE_ID-based UE grouping may be supported basically using UGfield-1. When the use of UE_G_ID configured for a special purpose is beneficial, the BS may activate and use UG-field-2 according to the situation.

In the above, a method of transmitting PEI (i.e., P-DCI, and PS-DCI) has been proposed. Specifically, the method of providing information about a UE group/sub-group through PEI, the method of including a short message (or related information) in PEI, and the power saving method using paging DCI when the PEI is not configured have been discussed. These methods may increase power consumption efficiency by reducing the situations where the idle/inactive mode UE unnecessarily monitors the PO. In addition, in the proposed methods, the UE monitoring PEI may obtain some information that may be received through paging DCI such as a short message only by receiving PEI. Accordingly, the benefit of power saving may be further improved by preventing the UE from additionally detecting paging DCI to obtain such information.

The paging mentioned for description of PEI is an example to which the present disclosure is applicable. As described in the introduction, the proposals in this specification may be generally applied to a transmission/reception scheme using a signal/channel to pre-notify whether a specific signal/channel is transmitted or to pre-provide some specific information for the purpose of power saving or complexity/overhead reduction. For example, the signal (e.g., channel/signal-A such as PEI/P-DCI/PS-DCI) may be transmitted for the purpose of TRS/CSI-RS availability indication. Signal-B may be a reference signal (e.g., DMRS, CSI-RS/TRS) that the UE may expect.

Figure 16:
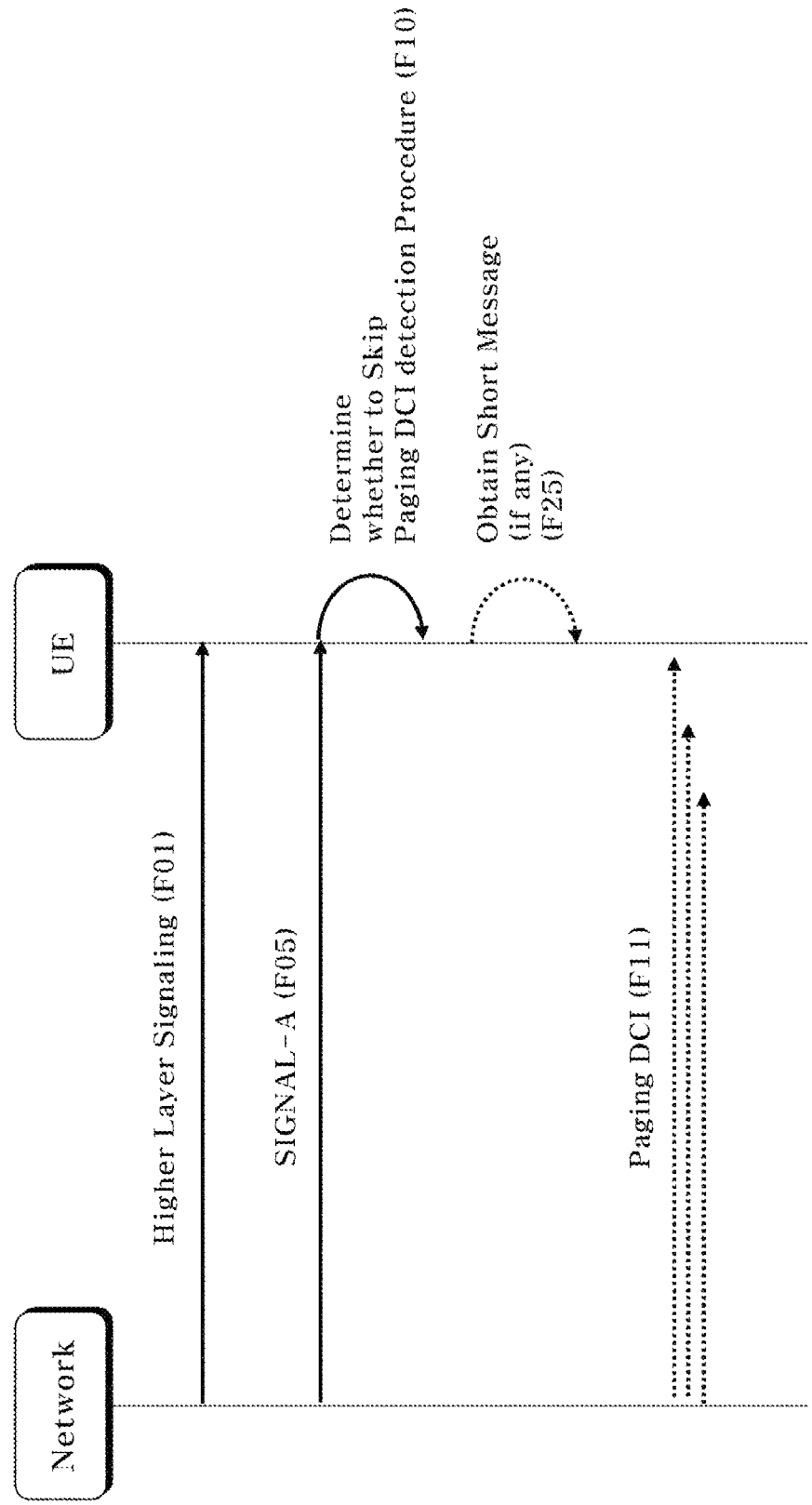
FIG. 16 illustrates a flow of a signal transmission/reception method according to an embodiment of the present disclosure.

FIG. 16 illustrates a flow of a signal transmission/reception method according to an embodiment of the present disclosure. FIG. 16 is an application/implementation example of at least a part of the above-described proposals. Redundant descriptions thereof will be omitted and the above descriptions may be referred to as necessary.

Referring to FIG. 16, the BS may transmit SIGNAL-A for early indication of whether paging control information (DCI) will be provided on a paging occasion (PO) configured for paging operation in an idle mode or inactive mode (F05). The UE may receive SIGNAL-A for early indication of whether paging DCI will be provided on the PO configured for the paging operation in the idle mode or inactive mode. SIGNAL-A may be a physical link control channel (PDCCH) signal carrying specific DCI (e.g., PEI, P(S)-DCI) configured for the idle mode or inactive mode.

The UE may determine whether to skip a paging DCI detection procedure based on SIGNAL-A (F10). Based on specific DCI being relatable to a plurality of POs, the UE may determine to skip the paging DCI detection procedure unless the at least one PO on which the paging DCI is provided is configured for the UE.

The BS may transmit paging DCI based on SIGNAL-A (F11). The BS may relate the specific DCI to a plurality of POs and transmit the specific DCI once to notify whether the paging DCI is provided for each of the plurality of POs at once.

Specific DCI early indicating whether the paging DCI is provided may contain a short message field related to at least one of a system information change or Earthquake and Tsunami Warning System/Commercial Mobile Alert System (ETWS/CMAS) indication. Even when the UE determines to skip the paging DCI detection procedure, it may obtain a value of the short message field included in the specific DCI (F25).

The short message field included in the specific DCI may be at least partially identical to the short message field included in the paging DCI.

When specific DCI is related to N POs={PO #1, PO #2, . . . , PO #N}, and each of the POs is related to each UE-group, the UE may determine the ID of a specific UE group to which the UE belongs, based on N, the number of POs related to the specific DCI and PO information configured for the UE.

The UE may identify a bit position related to a specific PO related to the specific UE group in the specific DCI based on the determined ID of the specific UE group.

The UE may determine the ID of the specific UE group, further considering the UE identifier of the UE.

The UE may determine whether to skip the paging DCI detection procedure based on whether the paging DCI is to be provided on a specific PO related to a specific UE group to which the UE belongs among the N POs related to the specific DCI.

The UE (in the RRC connected mode) may receive one or more higher layer signalings from the BS (F01). For example, the UE may obtain information about N, the number of POs related to the specific DCI from the BS. For example, the UE may obtain information about a field configuration of the specific DCI or a size of at least one field included in the specific DCI from the BS.

Various descriptions, functions, procedures, proposals, methods, and/or operation flowcharts of the present disclosure may be applied to, but not limited to, various fields requiring wireless communication/connection (e.g., 5G) between devices.

Specific examples will be described in detail with reference to the drawings. In the following drawings/descriptions, the same reference numerals may denote the same or corresponding hardware blocks, software blocks, or functional blocks, unless otherwise indicated.

Figure 17:
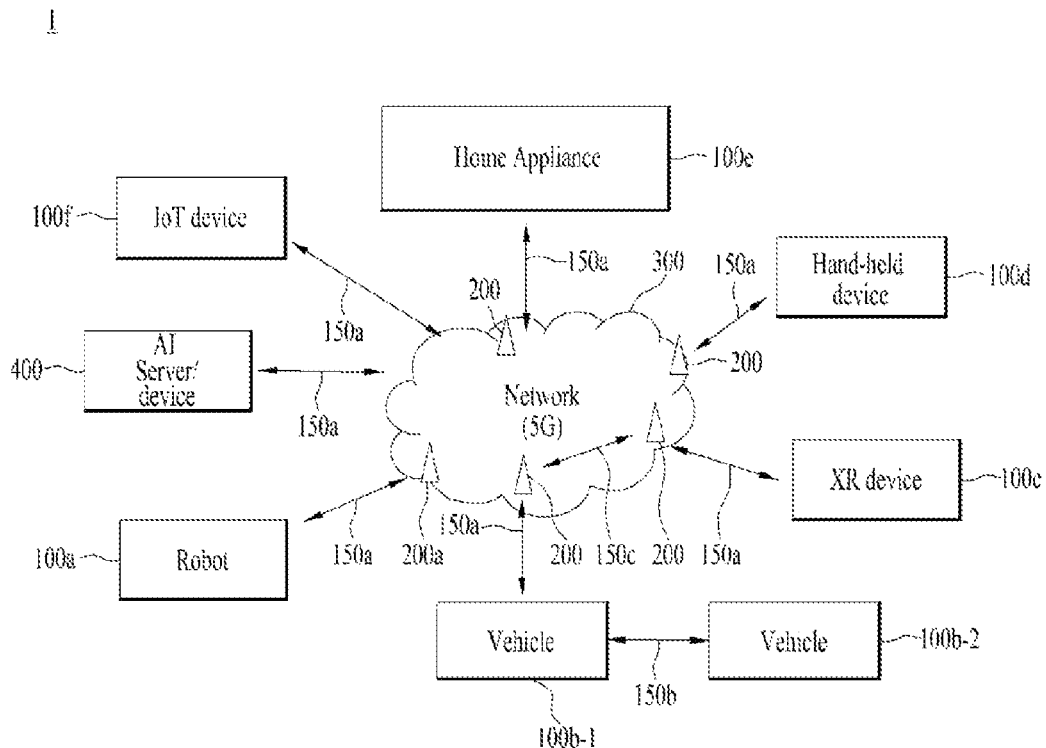
FIGS. 17 to 20 illustrate an example of a communication system 1 and wireless devices applicable to the present disclosure.

FIG. 17 illustrates a communication system 1 applied to the present disclosure.

Referring to FIG. 17, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 18:
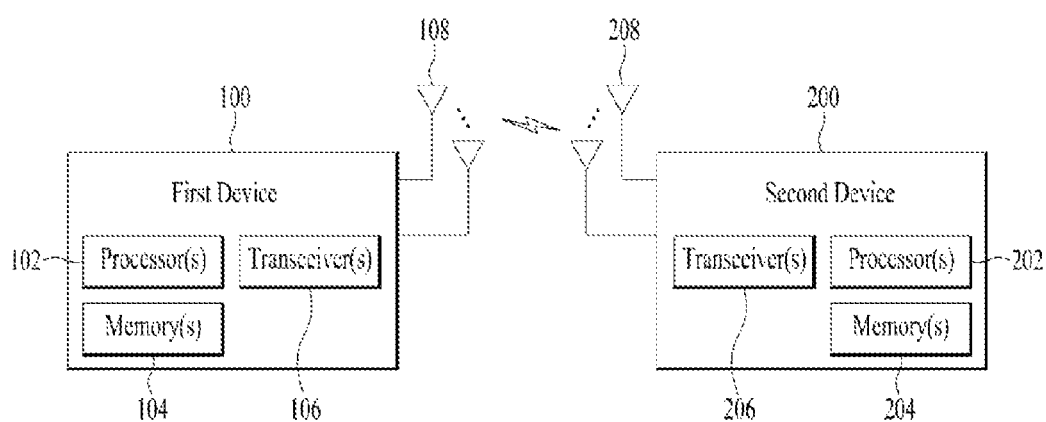

FIG. 18 illustrates wireless devices applicable to the present disclosure.

Referring to FIG. 18, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 17.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In an embodiment of the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In an embodiment of the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 19:
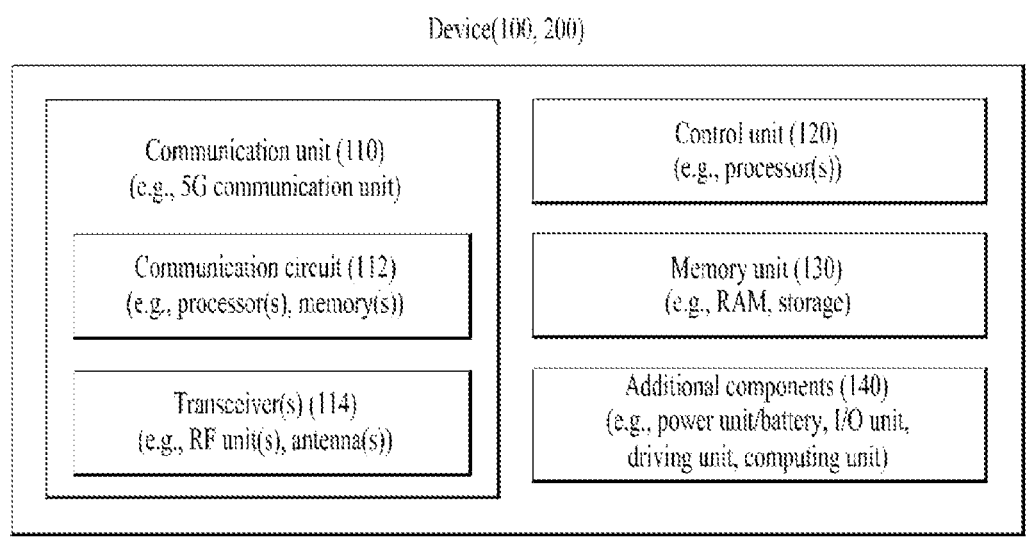

FIG. 19 illustrates another example of a wireless device applied to the present disclosure. The wireless device may be implemented in various forms according to a use-case/service (refer to FIG. 17).

Referring to FIG. 19, wireless devices 100 and 200 may correspond to the wireless devices 100 and 200 of FIG. 18 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 18. For example, the transceiver(s) 114 may include the one or more transceivers 106 and 206 and/or the one or more antennas 108 and 208 of FIG. 18. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 17), the vehicles (100b-1 and 100b-2 of FIG. 17), the XR device (100c of FIG. 17), the hand-held device (100d of FIG. 17), the home appliance (100e of FIG. 17), the IoT device (100f of FIG. 17), a digital broadcast terminal, a hologram device, a public safety device, an MTC device, a medicine device, a fintech device (or a finance device), a security device, a climate/environment device, the AI server/device (400 of FIG. 17), the BSs (200 of FIG. 17), a network node, etc. The wireless device may be used in a mobile or fixed place according to a use-example/service.

In FIG. 19, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Figure 20:
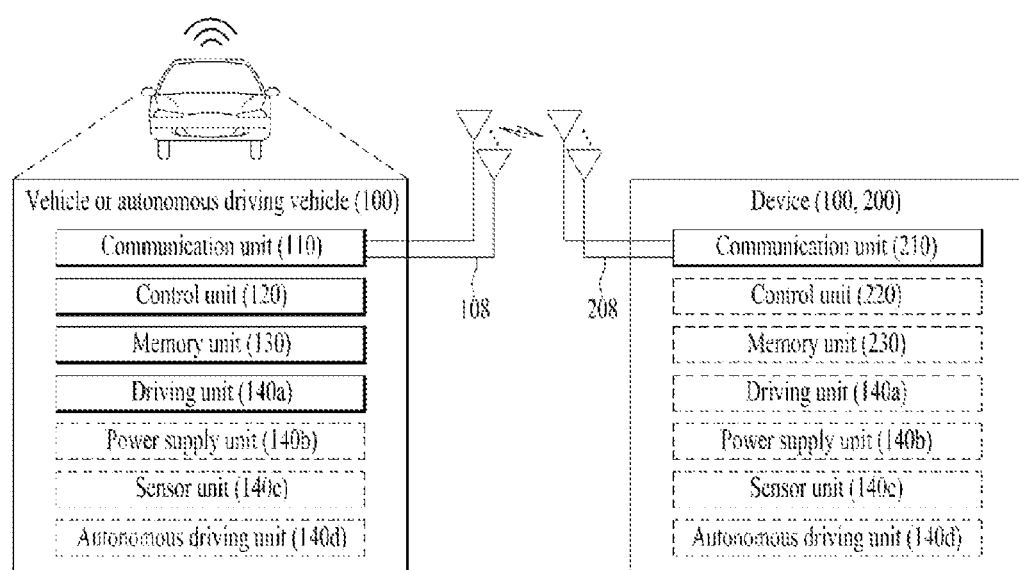

FIG. 20 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 20, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 19, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Figure 21:
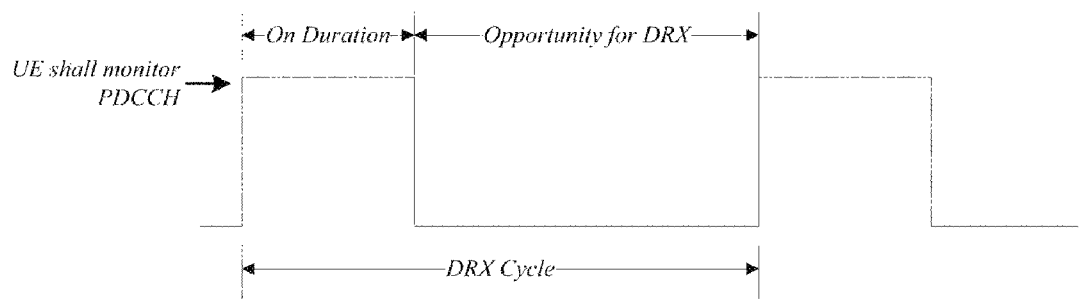
FIG. 21 illustrates an exemplary discontinuous reception (DRX) operation applicable to the present disclosure.

FIG. 21 is a diagram illustrating a DRX operation of a UE according to an embodiment of the present disclosure.

The UE may perform a DRX operation in the afore-described/proposed procedures and/or methods. A UE configured with DRX may reduce power consumption by receiving a DL signal discontinuously. DRX may be performed in an RRC_IDLE state, an RRC_INACTIVE state, and an RRC_CONNECTED state. The UE performs DRX to receive a paging signal discontinuously in the RRC_IDLE state and the RRC_INACTIVE state. DRX in the RRC_CONNECTED state (RRC_CONNECTED DRX) will be described below.

Referring to FIG. 21, a DRX cycle includes an On Duration and an Opportunity for DRX. The DRX cycle defines a time interval between periodic repetitions of the On Duration. The On Duration is a time period during which the UE monitors a PDCCH. When the UE is configured with DRX, the UE performs PDCCH monitoring during the On Duration. When the UE successfully detects a PDCCH during the PDCCH monitoring, the UE starts an inactivity timer and is kept awake. On the contrary, when the UE fails in detecting any PDCCH during the PDCCH monitoring, the UE transitions to a sleep state after the On Duration. Accordingly, when DRX is configured, PDCCH monitoring/reception may be performed discontinuously in the time domain in the afore-described/proposed procedures and/or methods. For example, when DRX is configured, PDCCH reception occasions (e.g., slots with PDCCH SSs) may be configured discontinuously according to a DRX configuration in an embodiment of the present disclosure. On the contrary, when DRX is not configured, PDCCH monitoring/reception may be performed continuously in the time domain. For example, when DRX is not configured, PDCCH reception occasions (e.g., slots with PDCCH SSs) may be configured continuously in an embodiment of the present disclosure. Irrespective of whether DRX is configured, PDCCH monitoring may be restricted during a time period configured as a measurement gap.

Table 8 describes a DRX operation of a UE (in the RRC_CONNECTED state). Referring to Table 8, DRX configuration information is received by higher-layer signaling (e.g., RRC signaling), and DRX ON/OFF is controlled by a DRX command from the MAC layer. Once DRX is configured, the UE may perform PDCCH monitoring discontinuously in performing the afore-described/proposed procedures and/or methods.

TABLE 8

| | Type of signals | UE procedure |
|---|---|---|
| 1st step | RRC signalling (MAC-CellGroupConfig) | Receive DRX configuration information |
| 2nd Step | MAC CE ((Long) DRX command MAC CE) | Receive DRX command |
| 3rd Step | — | Monitor a PDCCH during an on-duration of a DRX cycle |

MAC-CellGroupConfig includes configuration information required to configure MAC parameters for a cell group. MAC-CellGroupConfig may also include DRX configuration information. For example, MAC-CellGroupConfig may include the following information in defining DRX.

Value of drx-OnDurationTimer: defines the duration of the starting period of the DRX cycle.

Value of drx-InactivityTimer: defines the duration of a time period during which the UE is awake after a PDCCH occasion in which a PDCCH indicating initial UL or DL data has been detected Value of drx-HARQ-RTT-TimerDL: defines the duration of a maximum time period until a DL retransmission is received after reception of a DL initial transmission.

Value of drx-HARQ-RTT-TimerDL: defines the duration of a maximum time period until a grant for a UL retransmission is received after reception of a grant for a UL initial transmission.

drx-LongCycleStartOffset: defines the duration and starting time of a DRX cycle.

drx-ShortCycle (optional): defines the duration of a short DRX cycle.

When any of drx-OnDurationTimer, drx-InactivityTimer, drx-HARQ-RTT-TimerDL, and drx-HARQ-RTT-TimerDL is running, the UE performs PDCCH monitoring in each PDCCH occasion, staying in the awake state.

The above-described embodiments correspond to combinations of elements and features of the present disclosure in prescribed forms. And, the respective elements or features may be considered as selective unless they are explicitly mentioned. Each of the elements or features can be implemented in a form failing to be combined with other elements or features. Moreover, it is able to implement an embodiment of the present disclosure by combining elements and/or features together in part. A sequence of operations explained for each embodiment of the present disclosure can be modified. Some configurations or features of one embodiment can be included in another embodiment or can be substituted for corresponding configurations or features of another embodiment. And, an embodiment may be configured by combining claims failing to have relation of explicit citation in the appended claims together or can be included as new claims by amendment after filing an application.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The present disclosure is applicable to UEs, BSs, or other apparatuses in a wireless mobile communication system.

The invention claimed is:

1. A method for receiving a signal by a user equipment (UE) in a wireless communication system, the method comprising:
receiving, through higher layer signaling, configuration information regarding first downlink control information (DCI) for early indicating, prior to a corresponding paging occasion (PO), whether the UE is required to monitor second DCI for paging;
receiving, based on the configuration information regarding the first DCI, a first physical downlink control channel (PDCCH) carrying the first DCI; and
determining, based on the first DCI whether the UE is required to monitor the second DCI,
wherein the first DCI is associated with a plurality of POs, and the configuration information regarding the first DCI includes information regarding a number of the plurality of POs associated with the first DCI,
wherein the first DCI includes a first field having N bits, and each of the N bits of the first field is related to a single UE-group, respectively,
wherein the UE obtains, based on an index of a specific UE-group to which the UE belongs from among N UE-groups related to the N bits, a bit value for the specific UE-group among the N bits, and
wherein, based on that the bit value obtained based the index of the specific UE-group is set to a first value for PO monitoring, the UE monitors the second DCI in a specific PO where the specific UE-group belongs.

2. The method of claim 1, wherein 1 UE-group is a UE sub-grouping unit for UEs monitoring the same PO.

3. The method of claim 2,
wherein the number of the plurality of POs is M, and
wherein each of the N UE-groups belongs to one of the M POs, where M is an integer less than N.

4. The method of claim 1, wherein the UE obtains the index of the specific UE-group to which the UE belongs, based on information for the number of the plurality of POs associated with the first DCI which is included in the configuration information regarding the first DCI.

5. The method of claim 1, wherein, based on the configuration information regarding the first DCI including an identifier of the UE and the number of the plurality of POs, the UE obtains the index of the specific UE-group to which the UE belongs.

6. The method of claim 1, wherein the index of the specific UE-group indicates a position of the bit value for the specific UE-group within the N bits.

7. The method of claim 1, wherein the higher layer signaling for the configuration information regarding the first DCI, includes a system information block (SIB).

8. The method of claim 1, wherein the first DCI includes a second field including tracking reference signal (TRS) information.

9. The method of claim 1, wherein the configuration information regarding the first DCI includes search space information of the first PDCCH carrying the first DCI.

10. The method of claim 1, wherein the configuration information regarding the first DCI includes information about a field configuration of the first DCI or a size of at least one field included in the first DCI.

11. A computer-readable recording medium having recorded thereon a program for carrying out the method of claim 1.

12. A device for wireless communication, the device comprising:
a memory storing instructions; and
a processor configured to execute the instructions to perform operations,
wherein the operations of the processor comprise:
receiving, through higher layer signaling, configuration information regarding first downlink control information (DCI) for early indicating, prior to a corresponding paging occasion (PO), whether the device is required to monitor second DCI for paging;
receiving, based on the configuration information regarding the first DCI, a first physical downlink control channel (PDCCH) carrying the first DCI; and
determining, based on the first DCI whether the device is required to monitor the second DCI,
wherein the first DCI is associated with a plurality of POs, and the configuration information regarding the first DCI includes information regarding a number of the plurality of POs associated with the first DCI,
wherein the first DCI includes a first field having N bits, and each of the N bits of the first field is related to a single device-group, respectively,
wherein the processor obtains, based on an index of a specific device-group to which the device belongs from among N device-groups related to the N bits, a bit value for the specific device-group among the N bits, and
wherein, based on that the bit value obtained based the index of the specific device-group is set to a first value for PO monitoring, the processor monitors the second DCI in a specific PO where the specific device-group belongs.

13. The deice according to claim 12, further comprising:
a transceiver,
wherein the device is a user equipment (UE) in a wireless communication system.

14. A method for transmitting a signal by a base station in a wireless communication system, the method comprising:
transmitting, through higher layer signaling, configuration information regarding first downlink control information (DCI) for early indicating, prior to a corresponding paging occasion (PO), whether a user equipment (UE) is required to monitor second DCI for paging;
transmitting, based on the configuration information regarding the first DCI, a first physical downlink control channel (PDCCH) carrying the first DCI; and
transmitting the second DCI to the UE, based on the first DCI,
wherein the first DCI is associated with a plurality of POs, and the configuration information regarding the first DCI includes information regarding a number of the plurality of POs associated with the first DCI,
wherein the first DCI includes a first field having N bits, and each of the N bits of the first field is related to a single UE-group, respectively,
wherein the base station determines, based on an index of a specific UE-group to which the UE belongs from among N UE-groups related to the N bits, a bit value for the specific UE-group among the N bits, and
wherein, based on that the bit value determined based the index of the specific UE-group is set to a first value related to PO monitoring of the UE, the base station transmits the second DCI in a specific PO where the specific UE-group belongs.

15. A base station for transmitting a signal in a wireless communication system, the base station comprising:
a transceiver; and
a processor configured to control the transceiver to:
transmit, through higher layer signaling, configuration information regarding first downlink control information (DCI) for early indicating, prior to a corresponding paging occasion (PO), whether a user equipment (UE) is required to monitor second DCI for paging;
transmit, based on the configuration information regarding the first DCI, a first physical downlink control channel (PDCCH) carrying the first DCI; and
transmit the second DCI to the UE, based on the first DCI,
wherein the first DCI is associated with a plurality of POs, and the configuration information regarding the first DCI includes information regarding a number of the plurality of POs associated with the first DCI,
wherein the first DCI includes a first field having N bits, and each of the N bits of the first field is related to a single UE-group, respectively,
wherein the processor determines, based on an index of a specific UE-group to which the UE belongs from among N UE-groups related to the N bits, a bit value for the specific UE-group among the N bits, and
wherein, based on that the bit value determined based the index of the specific UE-group is set to a first value relted to PO monitoring of the UE, the processor transmits the second DCI in a specific PO where the specific UE-group belongs.

* * * * *